United States Patent
Sakagami

(10) Patent No.: US 8,269,850 B2
(45) Date of Patent: Sep. 18, 2012

(54) SIGNAL PROCESSING METHOD AND SIGNAL PROCESSING SYSTEM

(75) Inventor: Junichi Sakagami, Tokyo (JP)

(73) Assignee: Sony Corporation (JP)

( * ) Notice: Subject to any disclaimer, the term of this patent is extended or adjusted under 35 U.S.C. 154(b) by 249 days.

(21) Appl. No.: 12/451,924

(22) PCT Filed: Jun. 5, 2008

(86) PCT No.: PCT/JP2008/060718
§ 371 (c)(1),
(2), (4) Date: Dec. 4, 2009

(87) PCT Pub. No.: WO2008/150017
PCT Pub. Date: Dec. 11, 2008

(65) Prior Publication Data
US 2010/0118186 A1    May 13, 2010

(30) Foreign Application Priority Data
Jun. 7, 2007 (JP) ............................... 2007-151090

(51) Int. Cl.
*H04N 5/228* (2006.01)
*H04N 5/76* (2006.01)

(52) U.S. Cl. .................................. 348/222.1; 348/231.6

(58) Field of Classification Search ............... 348/222.1, 348/231.7, 237, 298; 382/162–167, 298–300
See application file for complete search history.

(56) References Cited

U.S. PATENT DOCUMENTS

| | | | |
|---|---|---|---|
| 5,619,596 A * | 4/1997 | Iwaki et al. .................... | 382/278 |
| 6,118,457 A * | 9/2000 | Ohtsuka et al. ............... | 345/620 |
| 6,816,166 B2 | 11/2004 | Shimizu et al. | |
| 7,679,644 B2 * | 3/2010 | Funato et al. ............... | 348/207.2 |
| 2002/0044778 A1 | 4/2002 | Suzuki | |
| 2003/0222998 A1 * | 12/2003 | Yamauchi et al. ............ | 348/262 |
| 2004/0196389 A1 * | 10/2004 | Honda ........................ | 348/231.7 |
| 2005/0212718 A1 * | 9/2005 | Nabeshima et al. ........... | 345/3.3 |
| 2006/0132628 A1 | 6/2006 | Suzuki | |

FOREIGN PATENT DOCUMENTS

| | | |
|---|---|---|
| EP | 1901553 A1 | 3/2008 |
| JP | 06-090435 A | 3/1994 |
| JP | 2002-027315 A | 1/2002 |
| JP | 2002-084547 A | 3/2002 |
| JP | 2003-346143 A | 12/2003 |

(Continued)

*Primary Examiner* — Lin Ye
*Assistant Examiner* — Euel Cowan
(74) *Attorney, Agent, or Firm* — Lerner, David, Littenberg, Krumholz & Mentlik, LLP

(57) ABSTRACT

A signal SG41 that has color signals thereof time-sequentially arranged in a color array corresponding to the color array in an image sensor 3 and that has not undergone resolution conversion is subjected to resolution conversion at a conversion rate (for example, ⅓) specified by a phase retention resolution conversion section 42. A de-mosaicing processing section 44 converts a signal SG42, which represents the order of the color array in the image sensor, into RGB signals SG44. A thin-line retention resolution conversion section 45 converts the signals SG44 into signals SG45 at a specified conversion rate (for example, ½). The signals SG45 are compressed by an encoder. In a recording medium 9, YC signals SG48 representing (640×480) pixels, the color signals SG42, a signal SG51 representing (640×480) pixels in the order of a color array and serving as thumbnail image data DT, and imaging information are recorded.

8 Claims, 17 Drawing Sheets

FOREIGN PATENT DOCUMENTS

| | | |
|---|---|---|
| JP | 3483426 B2 | 1/2004 |
| JP | 3557099 B2 | 8/2004 |
| JP | 2004-260813 A | 9/2004 |
| JP | 3654420 B2 | 6/2005 |
| JP | 2006-303693 A | 11/2006 |
| JP | 2006-340120 A | 12/2006 |

* cited by examiner

[FIG. 1]
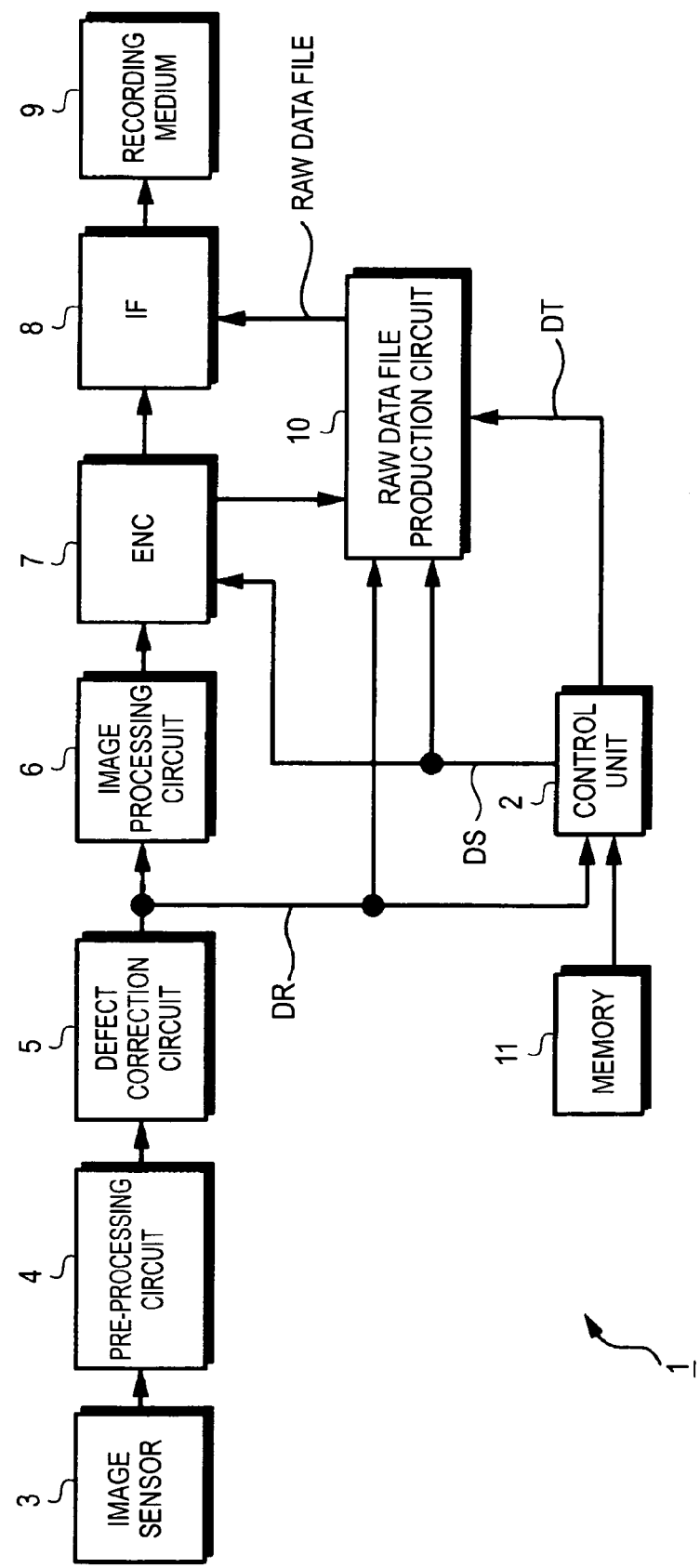

[FIG. 2]
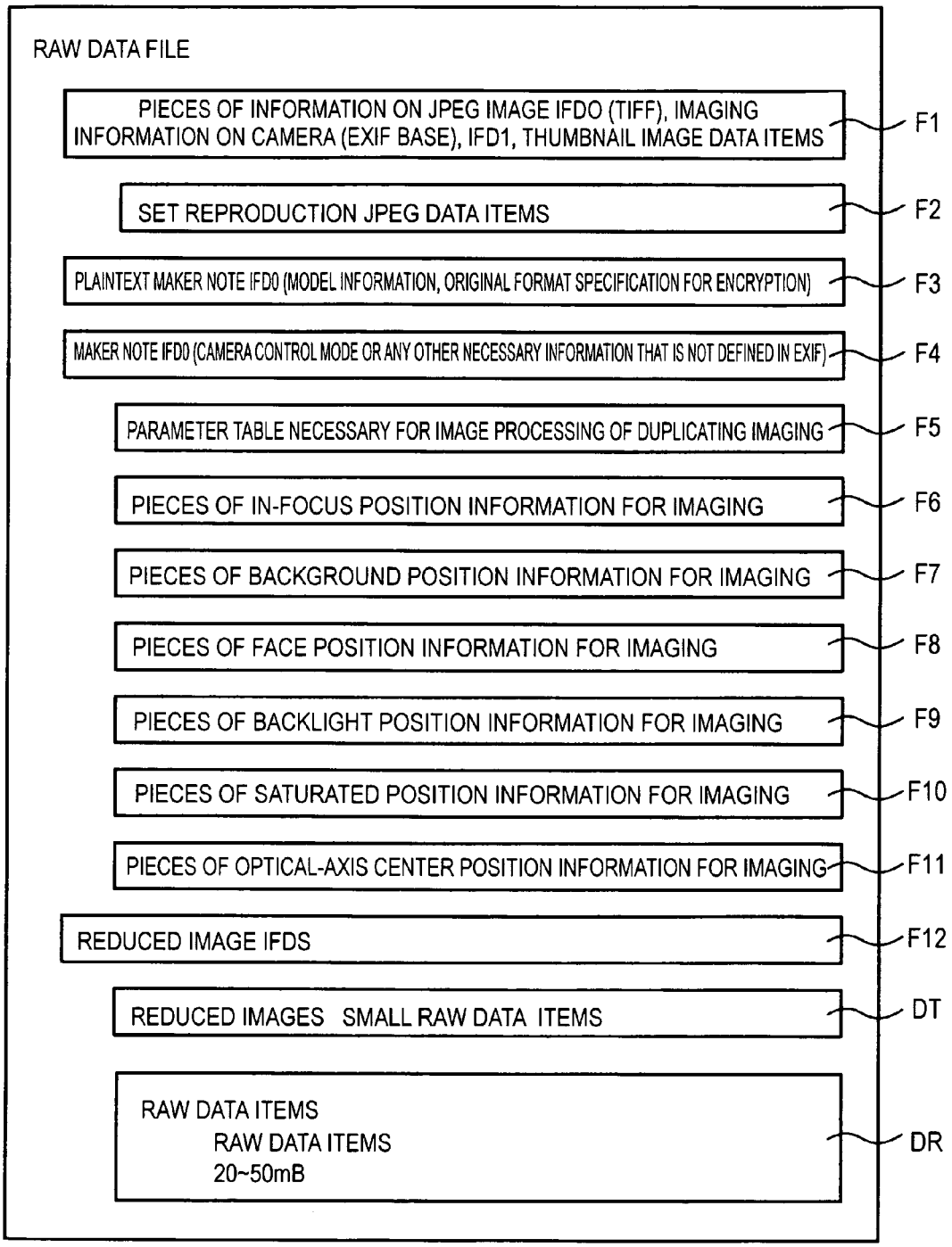

[FIG. 3]
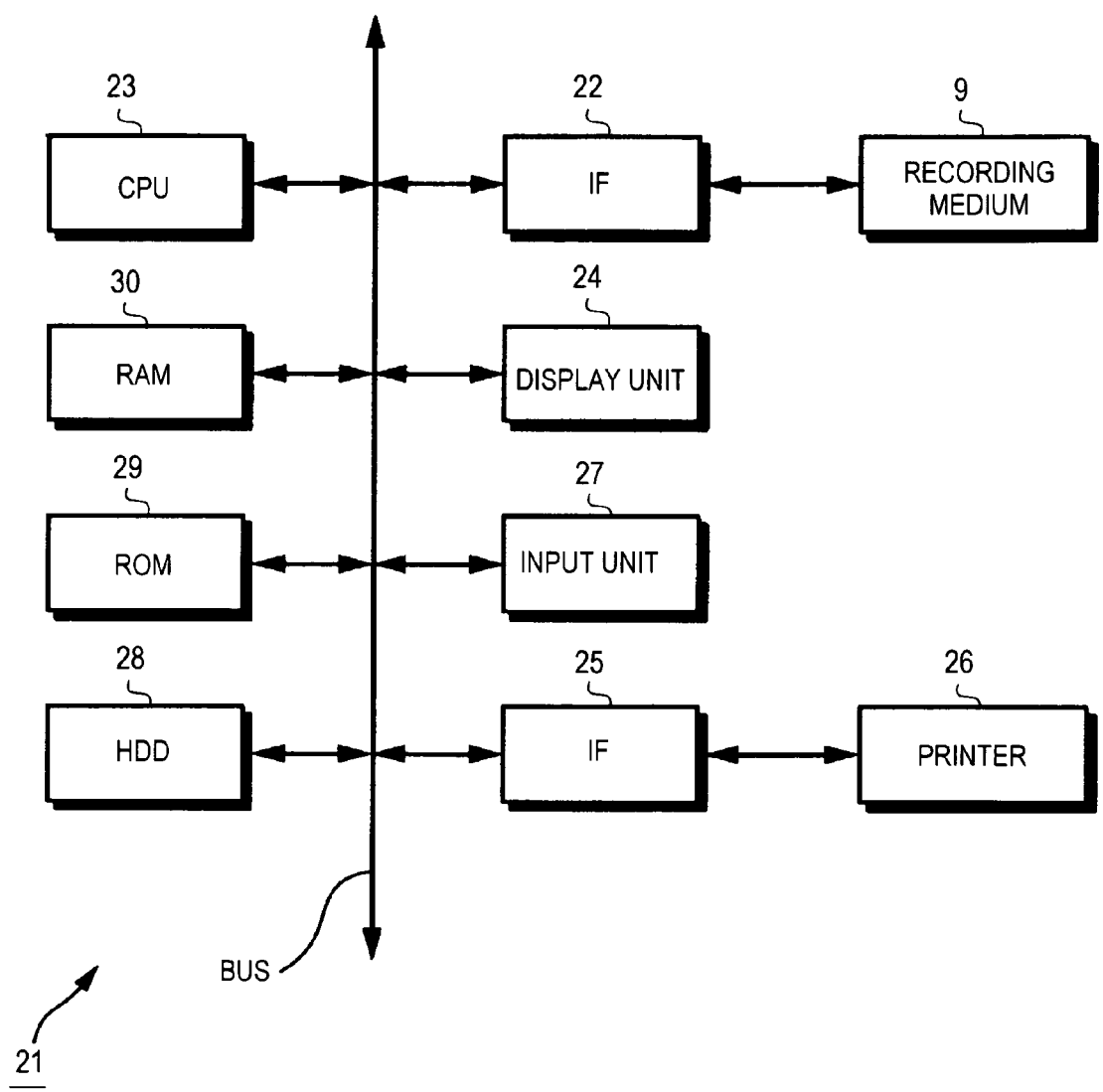

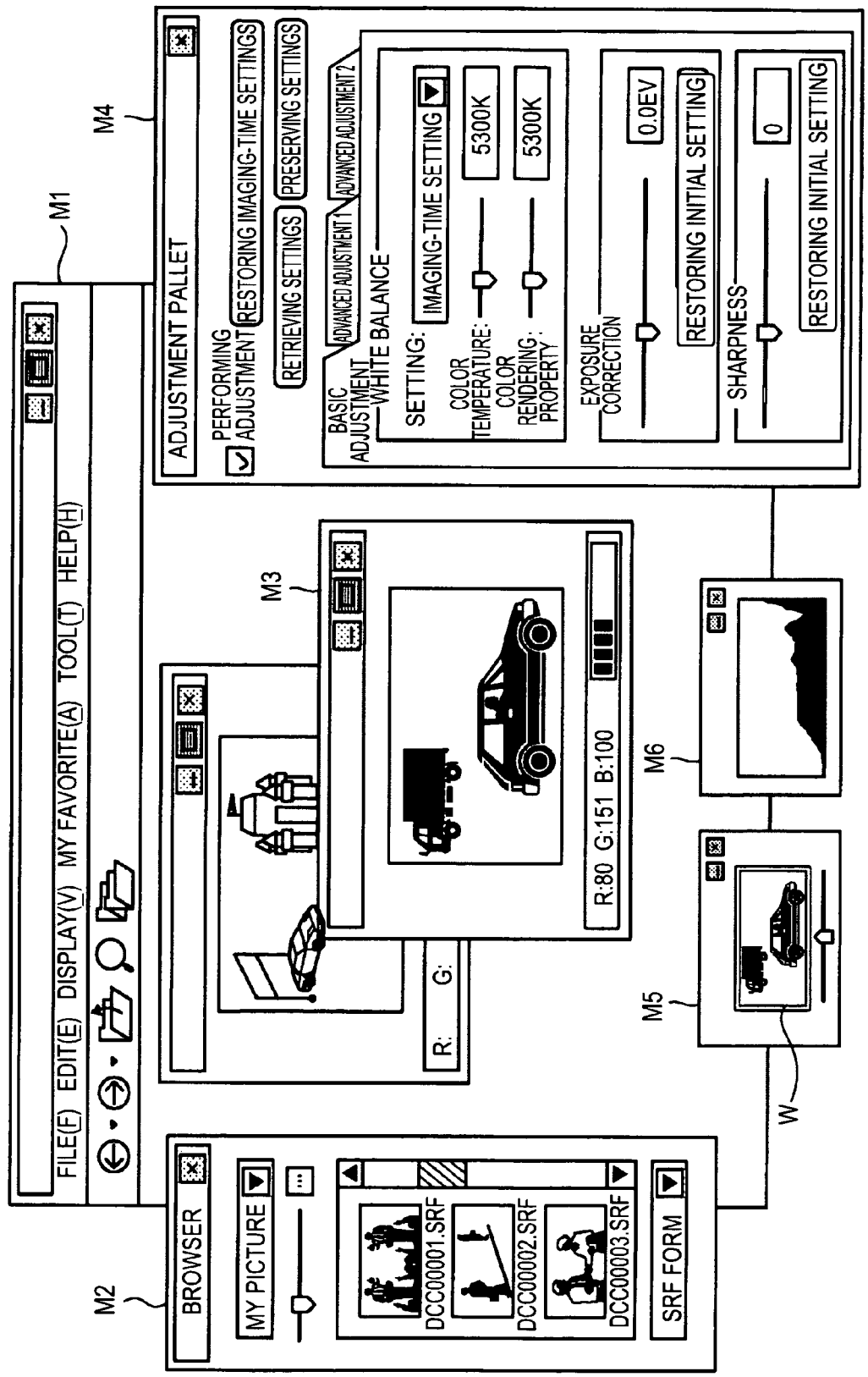

[FIG. 5A]
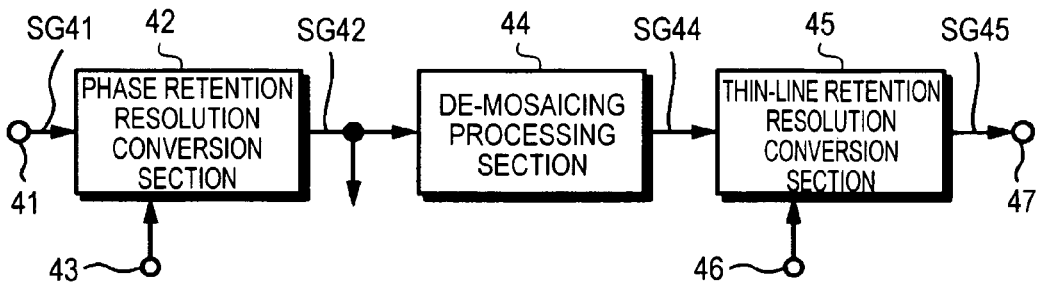
[FIG. 5B]
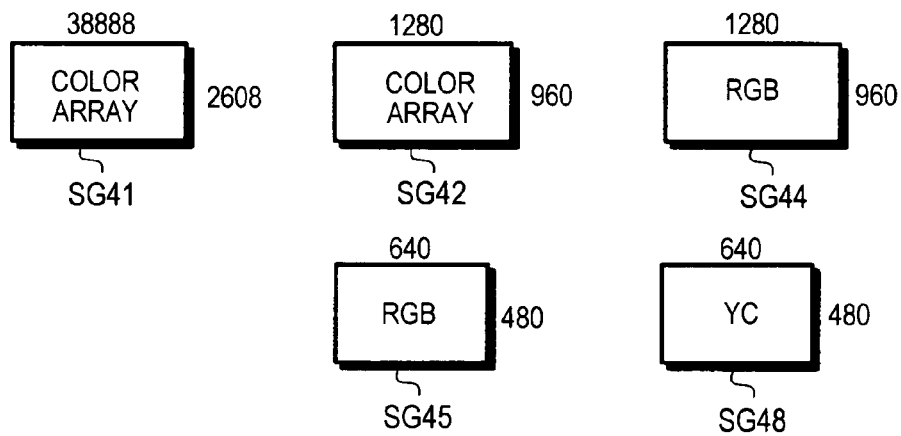
[FIG. 5C]
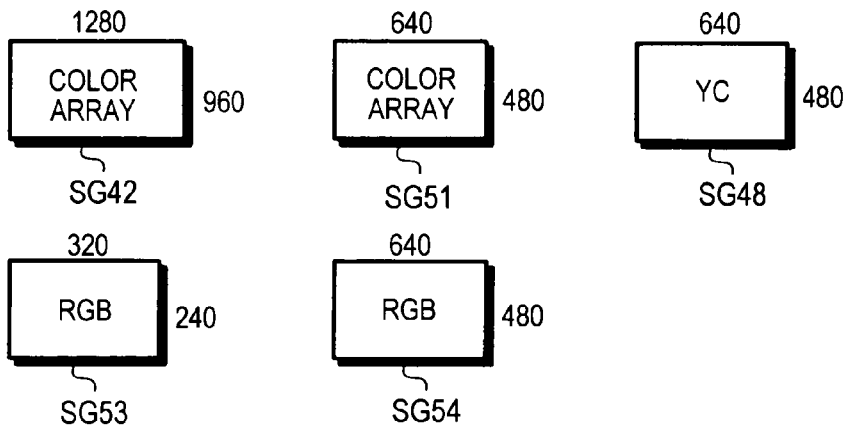

[FIG. 6]
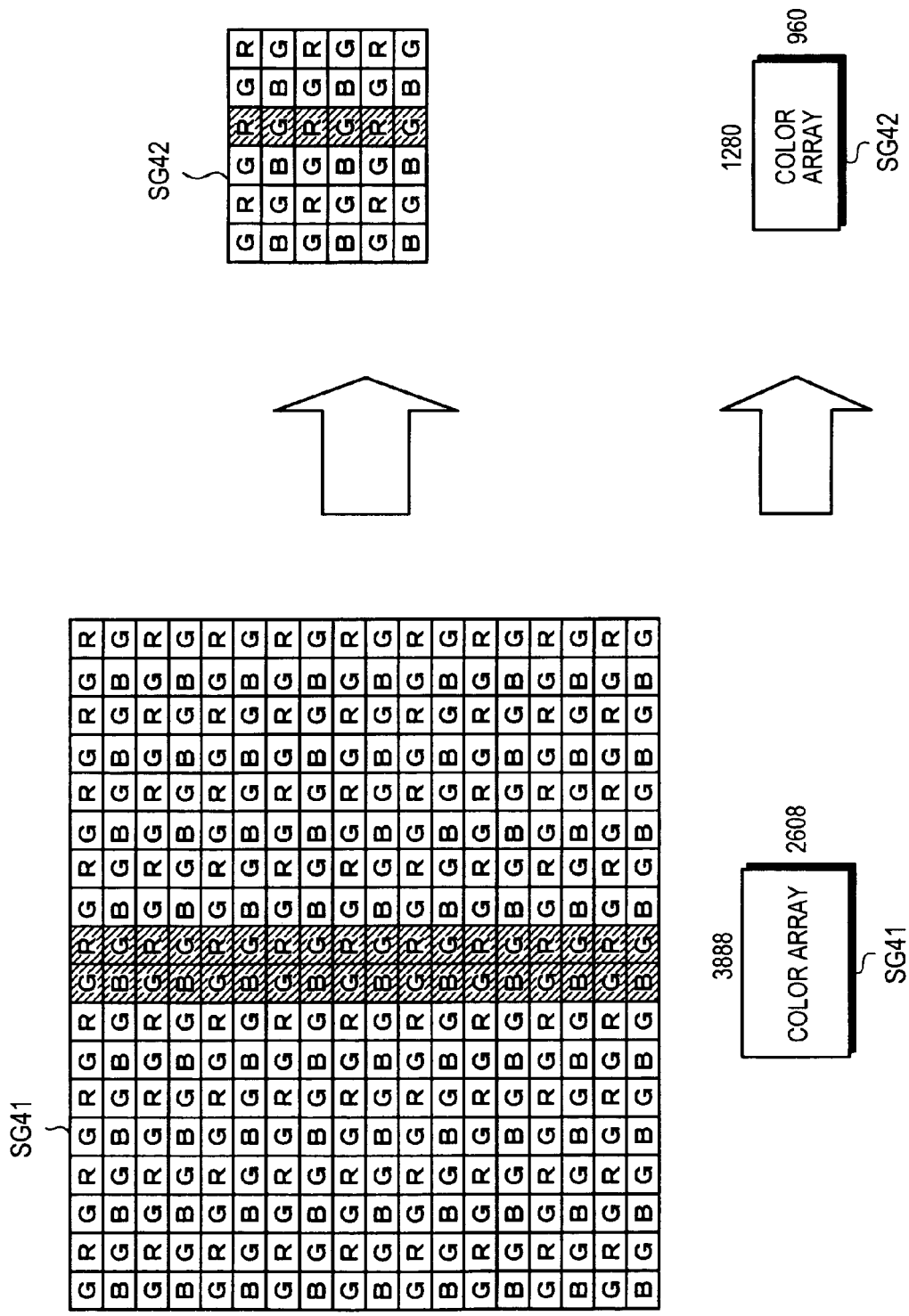

[FIG. 7]
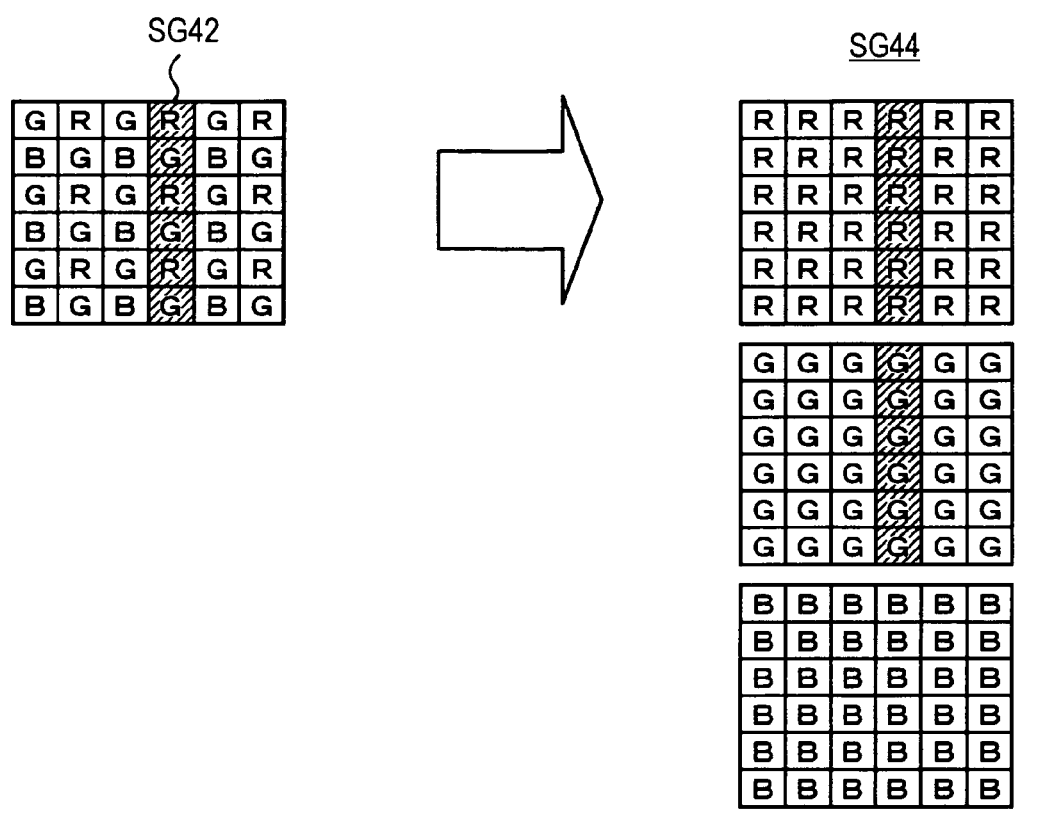
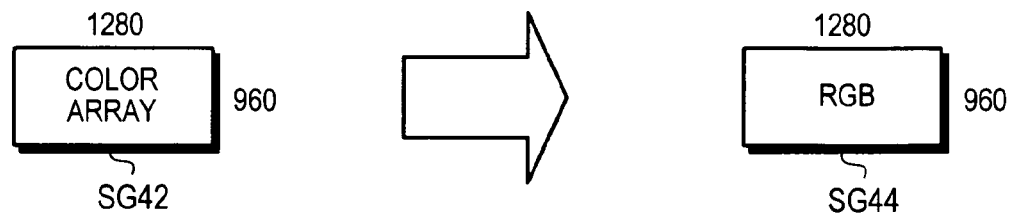

[FIG. 8]
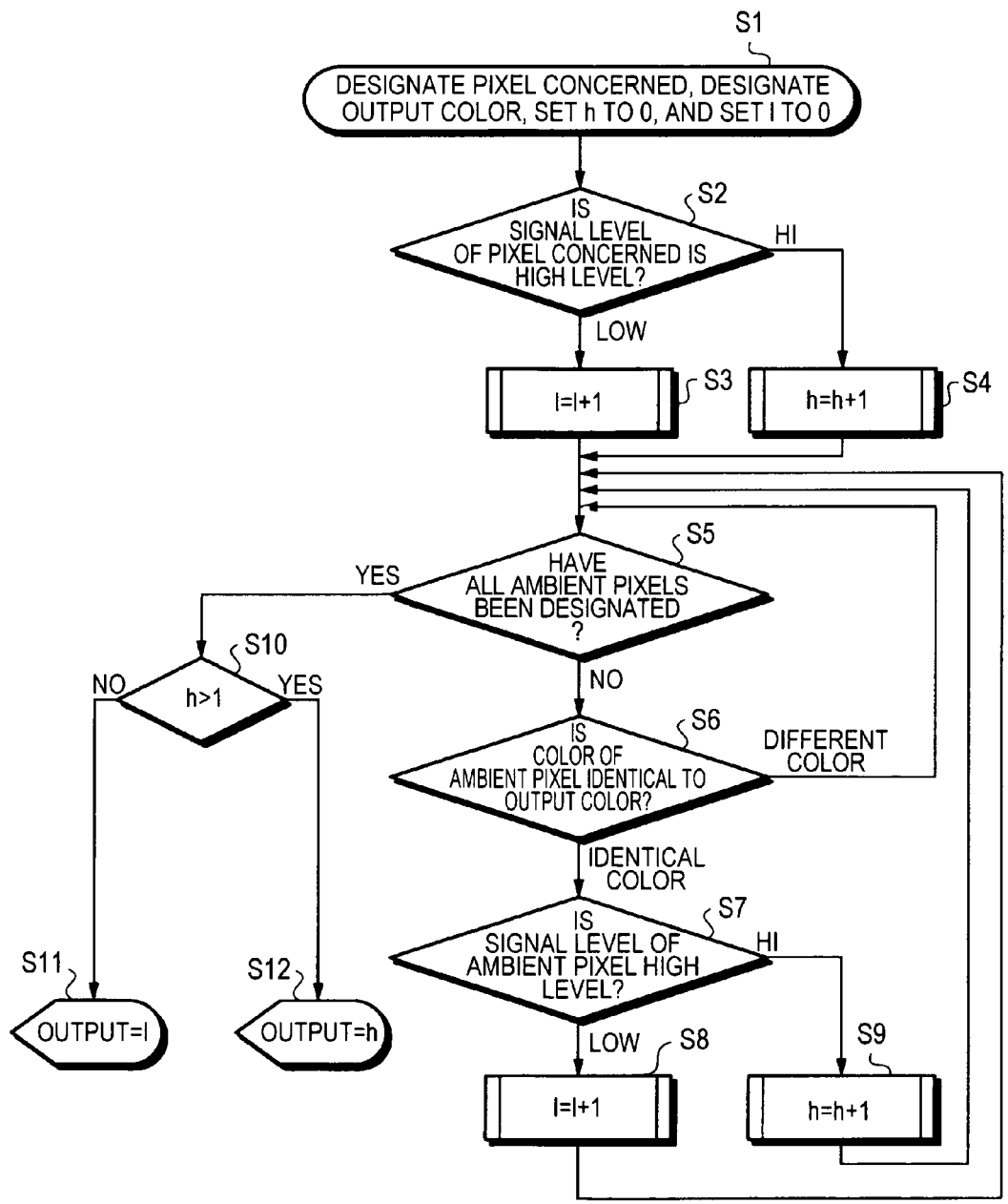

[FIG. 9]
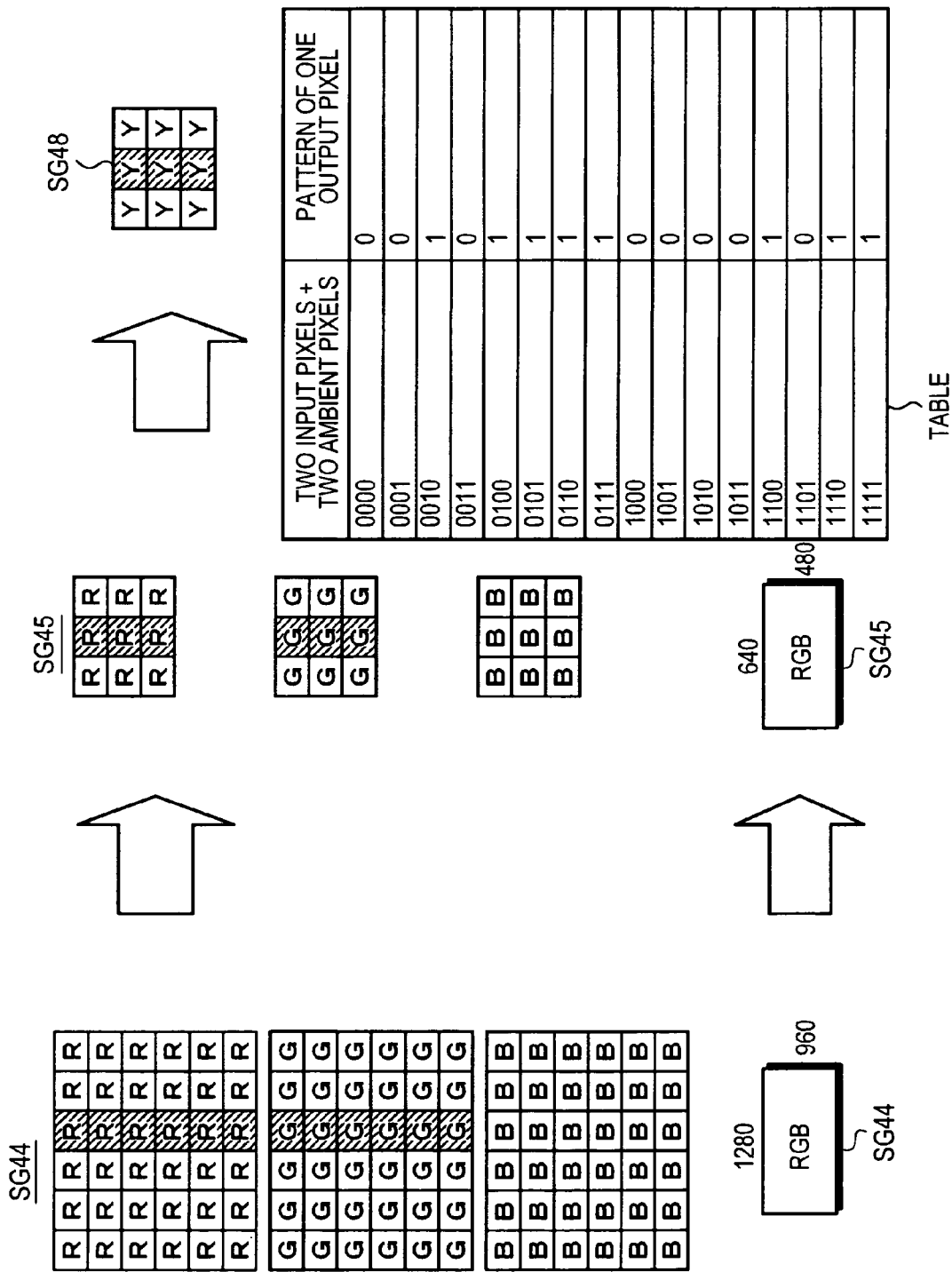

[FIG. 10]
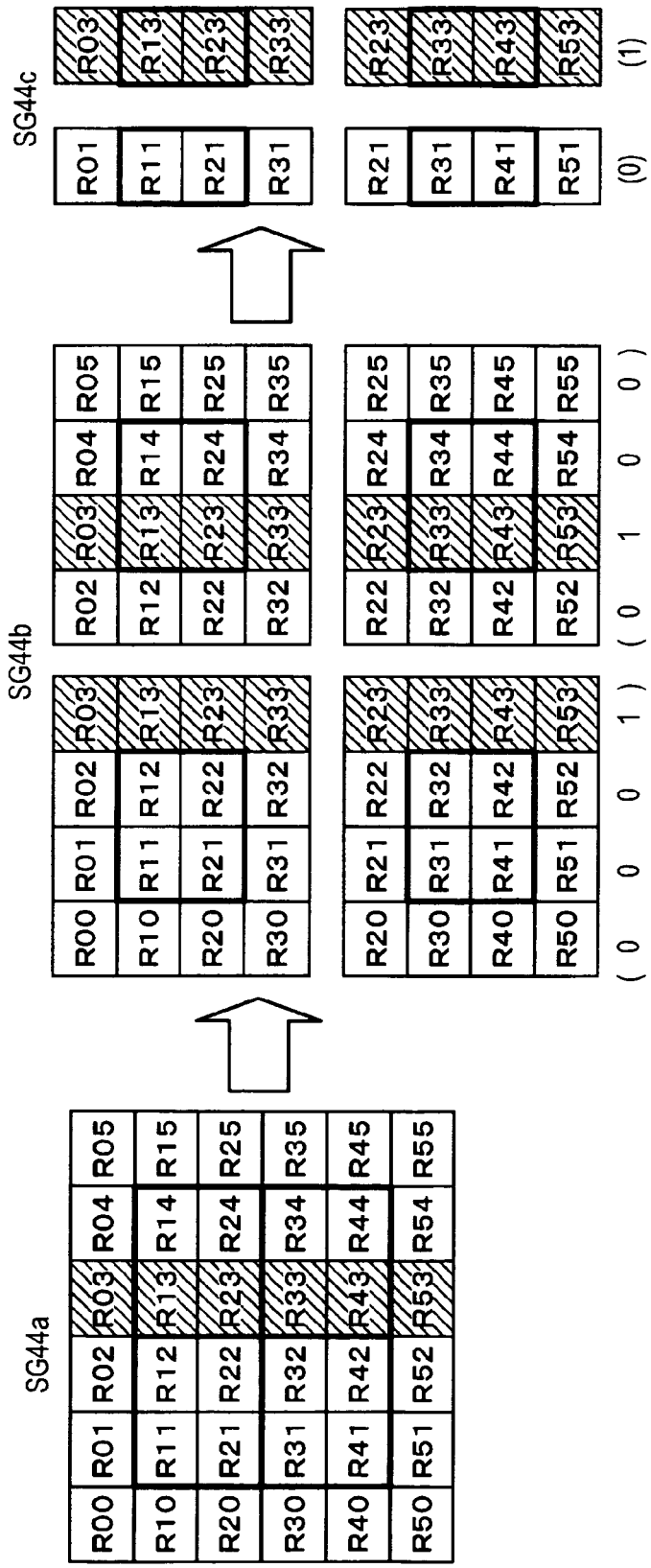

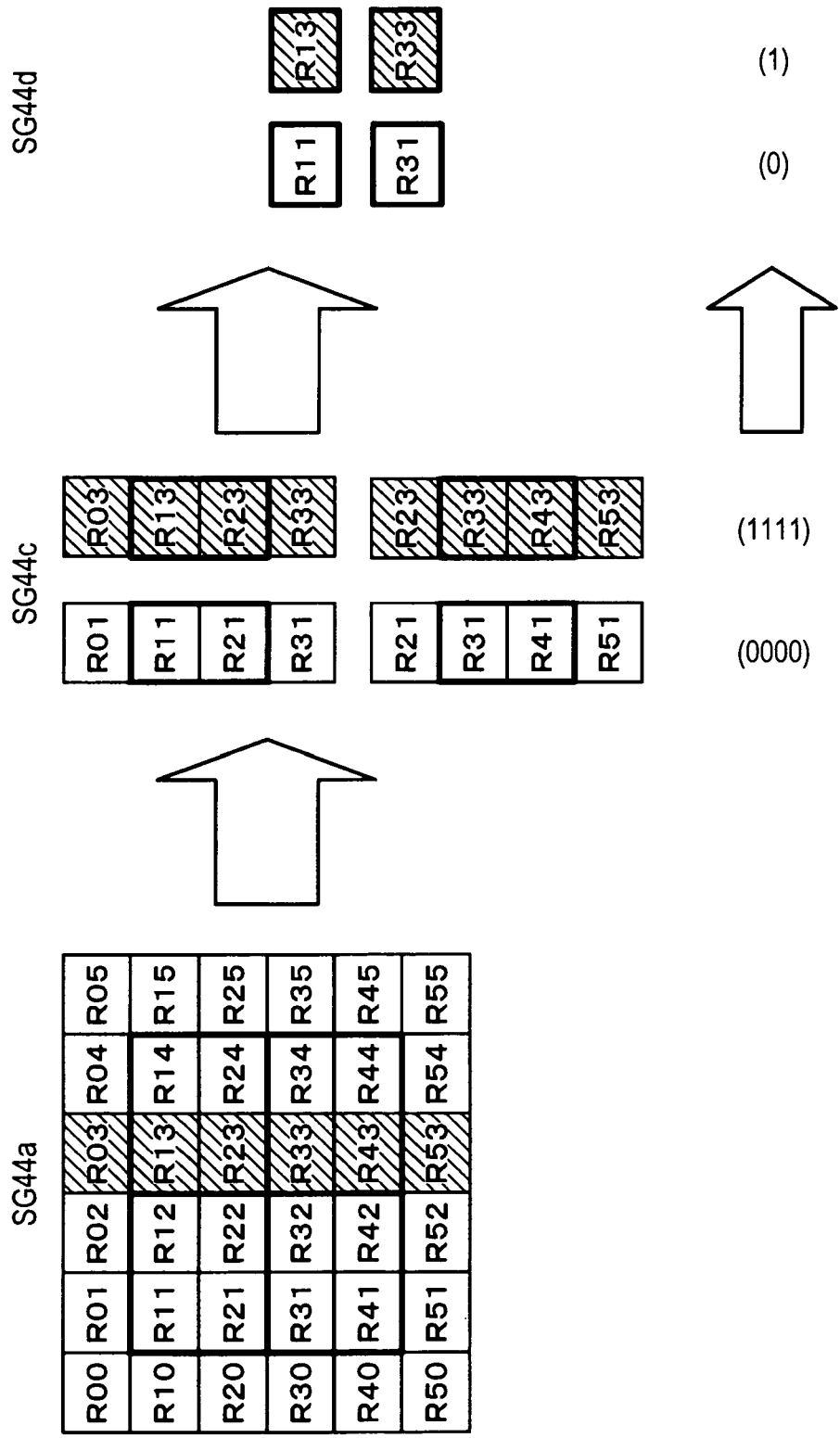
[FIG. 11]

[FIG. 12]
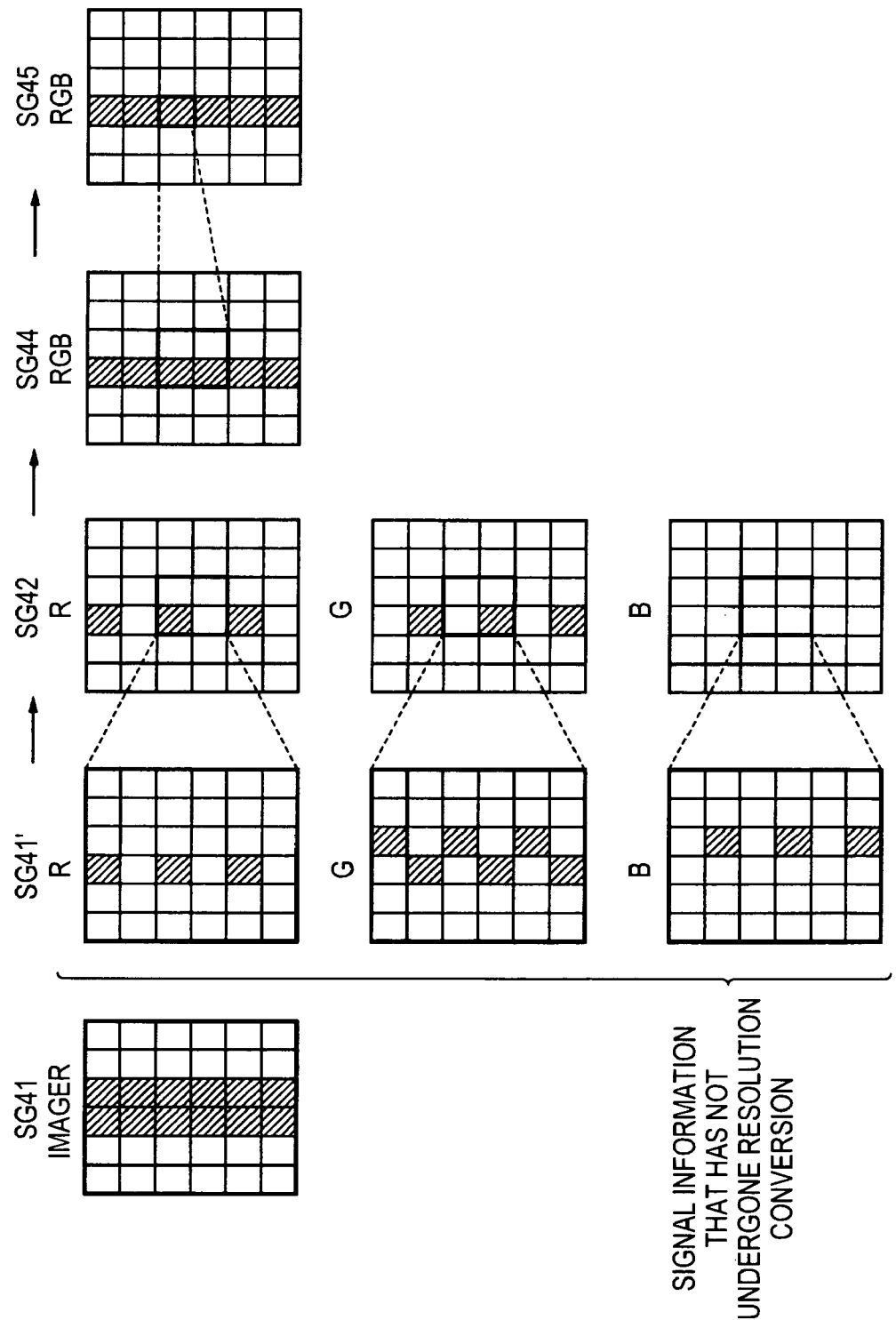

[FIG. 13]
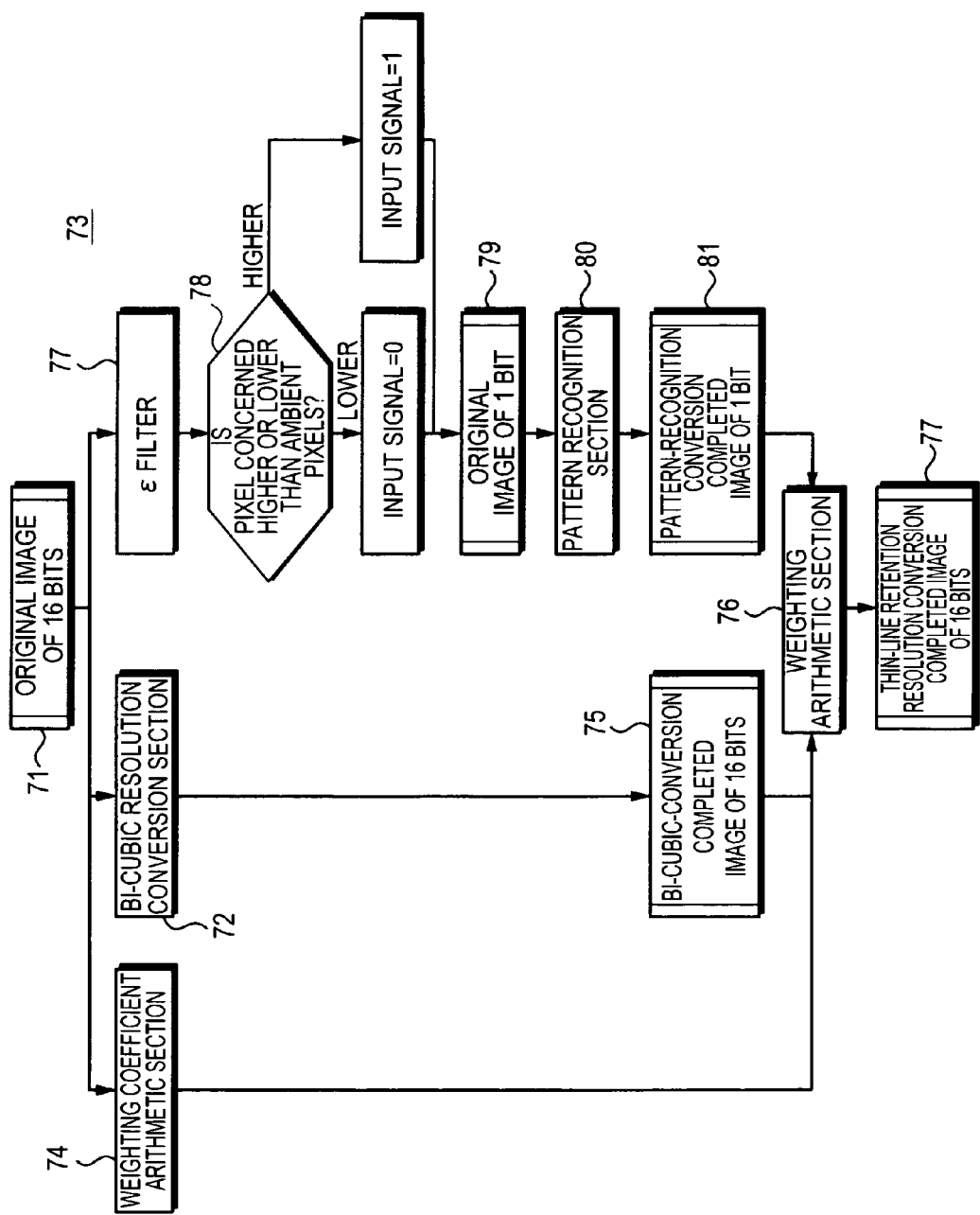

[FIG. 14A]
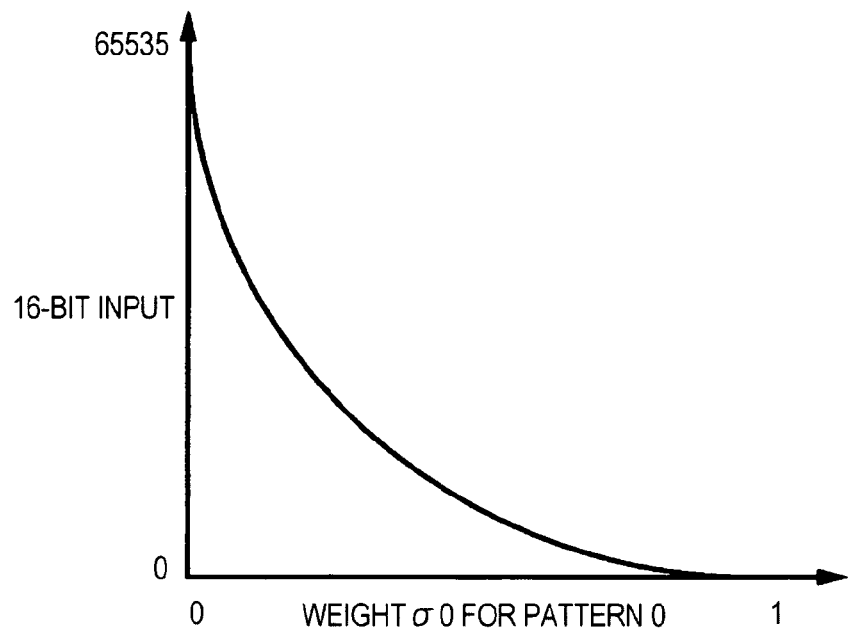
[FIG. 14B]
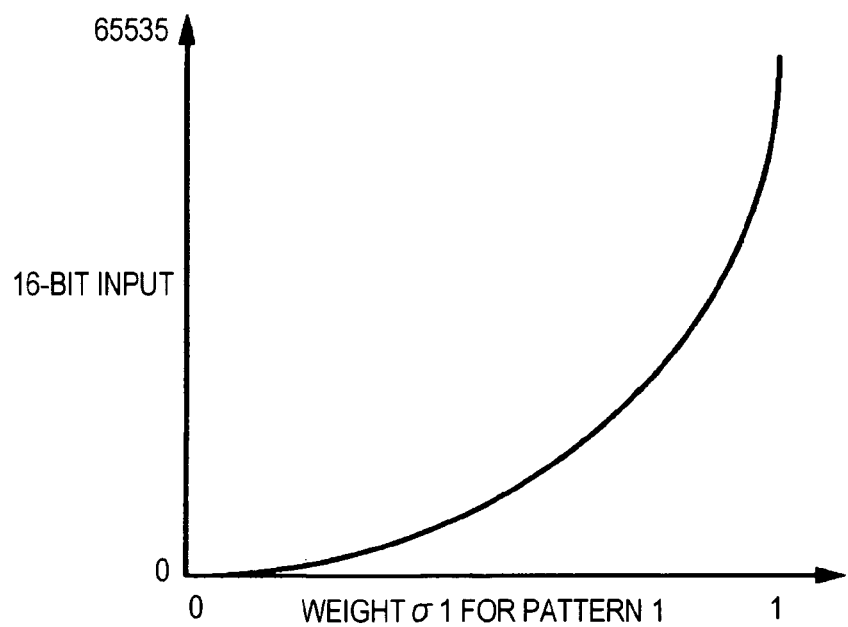

[FIG. 15A]
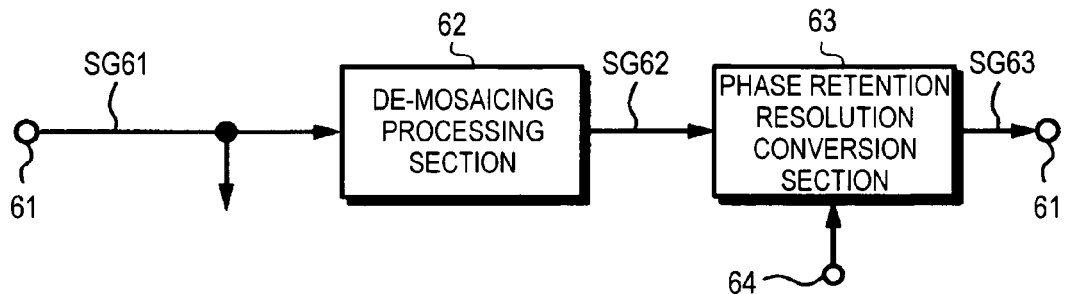
[FIG. 15B]
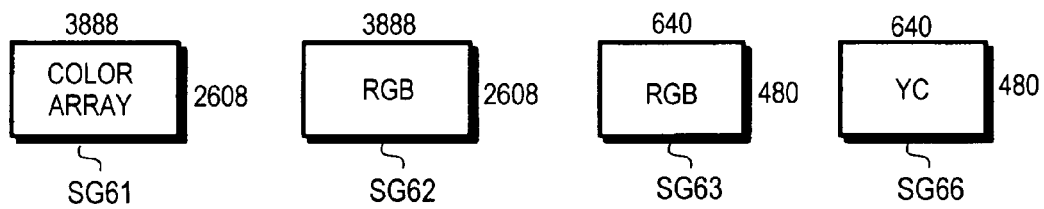
[FIG. 15C]
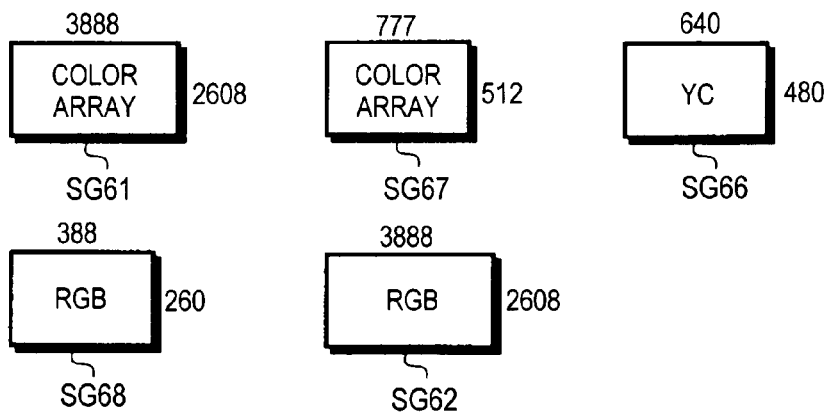

[FIG. 16]
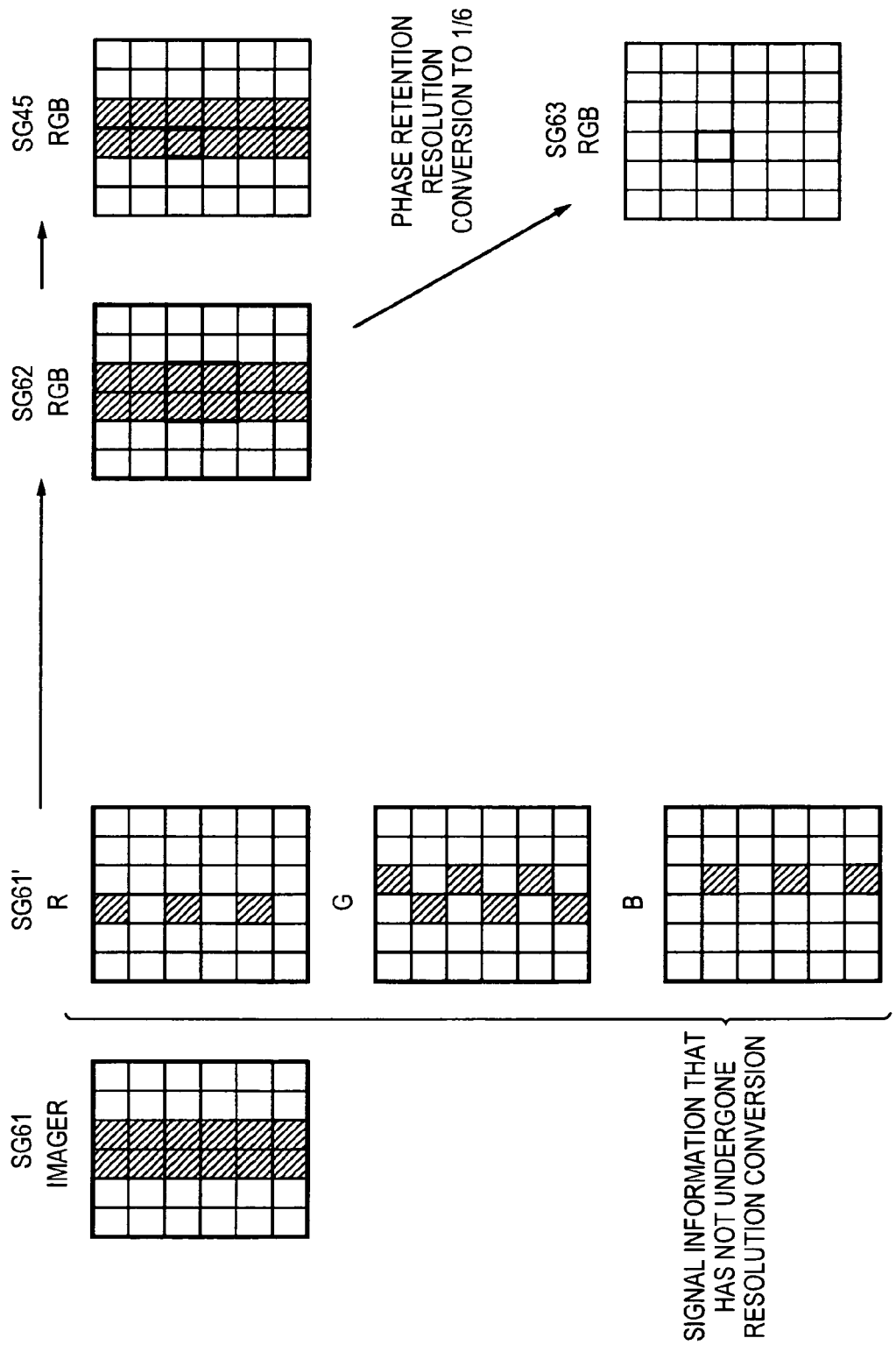

[FIG. 17]
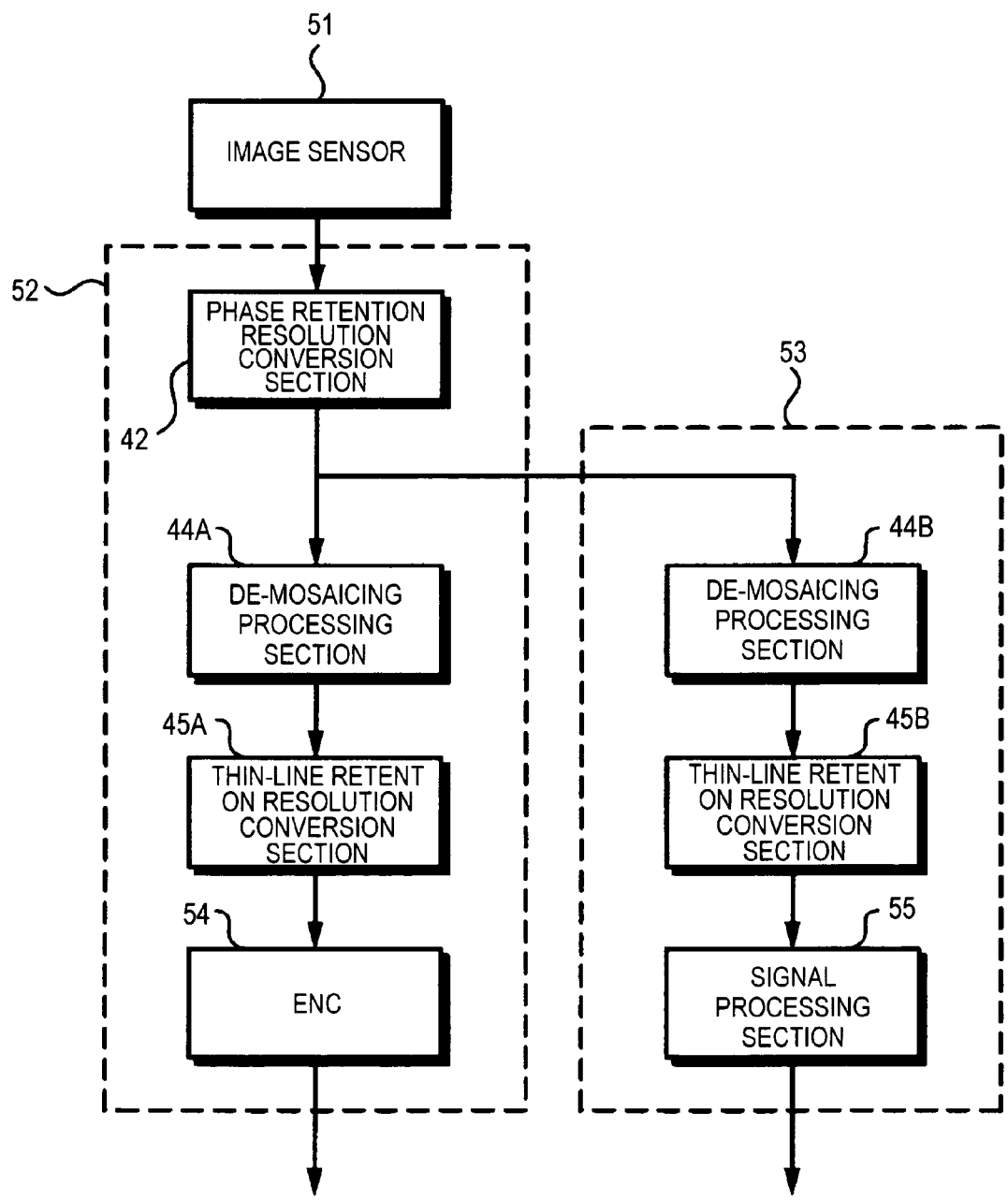

SIGNAL PROCESSING METHOD AND SIGNAL PROCESSING SYSTEM

CROSS-REFERENCES TO RELATED APPLICATIONS

The present application is a national phase entry under 35 U.S.C. §371 of International Application No. PCT/JP2008/060718 filed Jun. 5, 2008, published on Dec. 11, 2008 as WO 2008/150017 A1, which claims priority from Japanese Patent Application No. JP 2007-151090 filed in the Japanese Patent Office on Jun. 7, 2007.

TECHNICAL FIELD

The present invention relates to a signal processing method and a signal processing system capable of being adapted to an imaging apparatus, for example, a digital still camera.

BACKGROUND ART

Image quality correction processing (may be called development processing) such as gamma processing, automatic white balance processing, hue correction processing dependent on an imaging mode, frequency characteristic correction processing, or noise reduction processing is performed on a pickup signal obtained from an image sensor such as a charge-coupled device (CCD), that is, image data obtained as a result of imaging (hereinafter, referred to as raw data) in order to convert the raw data into visible image signals. Further, the image signals are compressed according to an irreversible compression method and stored in a recording medium. In contrast, in efforts to avoid degradation in image quality derived from the irreversible compression and enable image quality correction desired by a user himself/herself, a proposal has been made of a method in which: the raw data is recorded in the recording medium; the raw data recorded in the recording medium is inputted to an information processing system such as a computer; and image information is produced by the information processing system (refer to Japanese Patent No. 3230291).

The amount of raw data is much larger than the amount of image data resulting from image quality correction. This poses a problem in that it takes much time to produce image information from the raw data. In order to solve the problem, a proposal has been made of a method in which when image quality correction processing is performed in the information processing system, the raw data is subjected to reduction processing in order to produce a reduced image (hereinafter, referred to as a thumbnail image), and the thumbnail image is appended to the raw data and displayed earlier than the raw data is. The method suffers from a drawback that since image quality adjustment performed in the information processing system is not reflected on a display image, if thumbnail images are used to display a list, the thumbnail images differ from original images that are objects of adjustment.

Further, the method of producing thumbnail images in an information processing system and reflecting the results of image quality correction on the thumbnail images is proposed in JP-A-2003-346143. The method described in the literature is confronted with a problem that since the information processing system has to temporarily read all raw data items, user-friendliness may be impaired during display of a list.

DISCLOSURE OF THE INVENTION

In order to solve the foregoing problems, a technique of providing thumbnail images, on which effects of adjustment equivalent to those exerted in original images during adjustment are reflected, at a high speed in response to a user's request has been proposed in Japanese Patent Application No. 2006-166858 which has remained undisclosed at the date of priority of the present application. According to the method described in the application, although the thumbnail images can be provided at a high speed, the size of all the images depends on an imager size. Although a user requests an imaging apparatus to offer a sufficiently small output resolution, all the images cannot be provided at the high speed. In addition, de-mosaicing processing and processing of producing compressed-signal information which are performed in the imaging apparatus require a processing time long enough to process all the images. Further, there is a problem in that the processing of producing the thumbnail images may miss image information concerning a thin line or the like.

Incidentally, the processing of converting a pickup signal, which depends on a color array of color filters in an image sensor, into three primary-color signals RGB is color separation processing. The de-mosaicing processing means color separation processing to be performed in a case where the color array is mosaic. The invention can be applied to a case where color filters arranged like stripes are included. The invention can be applied to a case where complementary color filters are included.

Accordingly, an object of the present invention is to provide a signal processing method and a signal processing system that can improve user-friendliness by raising the processing speed to be attained during imaging, and reducing a necessary volume of a recording medium through high-speed color separation processing and resolution conversion processing.

For solving the foregoing problems, the present invention is a signal processing method including the steps of: performing first resolution conversion for phase retention on a signal that is fed from an image sensor and that represents the order of a color array in the image sensor; performing color separation processing on a first signal resulting from the first resolution conversion; and performing second resolution conversion for thin-line retention on second signals resulting from color separation processing.

The present invention is a signal processing system including:
a phase retention resolution conversion section that performs first resolution conversion for phase retention, on a signal that is fed from an image sensor and represents the order of a color array in the image sensor;
a color separation processing section that performs color separation processing on a first signal resulting from the first resolution conversion; and
a thin-line retention resolution conversion section that performs second resolution conversion for thin-line retention on second signals resulting from the color separation processing.

According to the present invention, a signal having a resolution little degraded can be provided. Further, since thinning processing is speeded up, an imaging apparatus can perform a high-speed continuous shooting action. Owing to a reduction in an amount of information, the number of images which the imaging apparatus can record in a recoding medium can be increased.

BRIEF DESCRIPTION OF THE DRAWINGS

FIG. 1 is a block diagram showing the configuration of an example of a digital still camera in accordance with an embodiment of the present invention;

FIG. 2 is a schematic diagram showing an example of a file format for data items to be recorded in a recording medium included in the embodiment of the present invention;

FIG. 3 is a block diagram showing an example of a computer serving as an information processing system that processes the results of imaging performed by the digital still camera;

FIG. 4 is a schematic diagram showing an example of an interface screen to be displayed during editing to be performed by the computer;

FIG. 5 includes a block diagram showing an example of a configuration relating to resolution conversion to be performed by an image processing system in the digital still camera in accordance with the embodiment of the present invention, and schematic diagrams for use in explaining an image format;

FIG. 6 is a schematic diagram for use in explaining a phase-retention resolution conversion section;

FIG. 7 is a schematic diagram for use in explaining de-mosaicing processing;

FIG. 8 is a flowchart for use in explaining the de-mosaicing processing;

FIG. 9 is a schematic diagram for use in explaining thin-line retention resolution conversion processing;

FIG. 10 is a schematic diagram showing in detail processing to be performed by the thin-line retention resolution conversion section in relation to a horizontal direction;

FIG. 11 is a schematic diagram showing in detail processing to be performed by the thin-line retention resolution conversion section in relation to a vertical direction;

FIG. 12 is a schematic diagram comprehensively showing the pieces of resolution conversion processing to be performed in the embodiment of the present invention;

FIG. 13 is a block diagram showing a configuration employed when processing to be performed by the thin-line retention resolution conversion section is applied to a case where a pixel is 16 bits long;

FIG. 14 includes schematic diagrams for use in explaining a weighting coefficient to be employed in the configuration shown in FIG. 13;

FIG. 15 includes a block diagram showing an example of a configuration relevant to resolution conversion, which is a reference example and is different from the present invention, and schematic diagrams for use in explaining an image format;

FIG. 16 is a schematic diagram comprehensively showing pieces of resolution conversion processing to be performed in the reference example; and FIG. 17 is a block diagram for use in explaining pieces of processing to be performed in an imaging apparatus and an information processing system.

BEST MODE FOR CARRYING OUT THE INVENTION

Referring to the drawings, an example of an imaging apparatus in accordance with an embodiment of the present invention, for example, a digital still camera 1 will be described below. The overall configuration of the embodiment is shown in FIG. 1. An imaging optical system (not shown) acts according to imaging conditions instructed by a control unit 2 formed with a microcomputer. Subject light having passed through the imaging optical system is routed to an image sensor 3.

The imaging optical system includes a zoom lens for use in enlarging or reducing a subject, a focus lens for use in adjusting a focal length, an iris (diaphragm) for use in adjusting an amount of light, a neutral density (ND) filter, and a drive circuit that drives the lenses and iris.

The image sensor 3 is a charge-coupled device (CCD), a complementary metal oxide semiconductor (CMOS), or the like. A pickup signal dependent on subject light is captured by the image sensor 3. The image sensor 3 may be of a primary-color type or a complementary-color type, and outputs an RGB primary-color signal or a pickup signal of complementary colors which is obtained by performing photoelectric conversion on an incident subject image.

The output signal of the image sensor 3 is fed to a pre-processing circuit 4. The pre-processing circuit 4 sequentially performs correlation double sampling processing, automatic gain control processing, and analog-to-digital conversion processing on the output signal of the image sensor 3. The output signal of the pre-processing circuit 4 is fed to a defect correction circuit 5. The defect correction circuit 5 performs defect correction processing on the output signal of the pre-processing circuit 4. Raw data DR is outputted as an output of the defect correction circuit 5.

The raw data is fed to an image processing circuit 6. The image processing circuit 6 sequentially executes pieces of image-quality correction processing such as resolution conversion processing, gamma correction processing, and white balance processing for the raw data, and outputs image data having undergone image-quality correction. The image data having undergone image-quality correction and being fed from the image processing circuit 6 is displayed on a display device, though the display device is not shown. Thus, a pickup image is displayed on a monitor.

The image data fed from the image processing circuit 6 is compressed by an encoder 7 according to, for example, the Joint Photographic Experts Group (JPEG) standards. The encoder 7 produces a thumbnail image from the image data, and outputs a result of exchangeable image file format for digital still camera (Exif) formatting processing. Under the control of the control unit 2, compressed image data of the thumbnail image is outputted to a raw data file production circuit 10.

An encoded output of the encoder 7 is fed to a recording medium 9 via an interface 8, and recorded in the recording medium 9. The interface 8 records data items, which are contained in a raw data file and outputted from the raw data file production circuit 10, in the recording medium 9 under the control of the control unit 2. In addition, the interface 8 reproduces data recorded in the recording medium 9 and outputs the data to the units.

The recording medium 9 is, for example, a memory card, and data outputted via the interface 8 is recorded in the recording medium 9. As the recording medium 9, various kinds of recording media including, in addition to the memory card, an optical disk and a magnetic disk can be adopted. The data recorded in the recording medium 9 is reproduced by a computer serving as an information processing system. The present invention is not limited to the use of the recording medium. Data may be transferred through communication with the information processing system.

The raw data file production circuit 10 produces a raw data file using raw data items DR, which have been subjected to thinning processing (phase-retention resolution conversion) by the image processing circuit 6, thumbnail image data items DT outputted from the control unit 2, and pieces of imaging information DS on pickup, and outputs the produced raw data file to the interface 8. Strictly speaking, pickup signals that have not undergone phase-retention resolution conversion are raw data items, and signals obtained by thinning the pickup signals through phase-retention resolution conversion are modified raw data items. However, in a description to be made below, the modified raw data shall be called simply raw data DR.

The thumbnail image data DT is produced by thinning the raw data DR. The imaging information DS is information on imaging conditions set in the digital still camera during imaging for acquiring raw data. The imaging information DS includes image-quality correction information, which specifies image-quality correction processing to be performed by the image processing circuit 6, and information on an optical system which specifies the settings of the lenses and image sensor 3. More particularly, the image-quality correction information is information that specifies correction of a hue, a gray scale, a frequency characteristic, or the like to be performed by the image processing circuit 6, and is realized with information on an image-quality correction mode (color mode). The information on the optical system includes pieces of information on a shutter speed, a focal length, an f-number, and others.

The raw data file is, as shown in FIG. 2, a file in which raw data items are recorded in a format conformable to the Exif, has a header as it is defined by the Exif, and has various kinds of data items allocated according to image file directories (IFDs).

In the raw data file, pieces of information (main image data items IFD0) required for reproduction of main image data items, and pieces of information (pieces of imaging information IFD1) on pickup of the main image data items are allocated to a field F1 that is a leading field of the file. Herein, raw data DR is assigned to the main image data. Information that specifies the digital still camera 1 used to pick up raw data or information on the imaging conditions is assigned to the information on pickup of main image data. More particularly, corresponding information defined in the Exif is assigned to the information on pickup of main image data. Pieces of information on an f-number, a focal length, and a shutter speed, information on an image-quality correction mode in the image processing circuit 6, and pieces of information such as a file name and a user name defined in the Exif are assigned to the information on pickup of main image data.

In the raw data file, thumbnail image data items produced by the encoder 7 as results of data compressions under the JPEG are allocated to a subsequent field F2. A thumbnail image includes, for example, (640 (horizontal direction)×480 (vertical direction)) pixels and is represented by component signals including a Y (luminance data) signal and a C (color data) signal.

In a subsequent field F3, pieces of information defined uniquely by the maker of the digital still camera 1 (a plaintext maker note IFD) are recorded. Since the raw data file has the three leading fields F1 to F3 created in the Exif format, raw data items assigned to main image data items can be reproduced by any of various kinds of applications capable of processing an Exif file.

The raw data file has pieces of imaging information on pickup of main image data items allocated to a subsequent field. More particularly, a maker note IFD0 (camera control mode and other pieces of necessary information which are not defined in the Exif) is recorded in a field F4. A parameter table necessary for image processing during which imaging is duplicated is recorded in a field F5. For example, the setting of the diaphragm in the digital still camera 1, a shutter speed, an imaging mode, and others which are adopted for pickup of each raw data DR are recorded.

In fields F6 to F10, various kinds of pieces of cutting reference information are placed. More particularly, pieces of in-focus position information for imaging detected through focusing are recorded in the field F6. The in-focus position information for imaging is positional information on an area in an image of each raw data DR that is in focus.

In a field F7, pieces of in-focus position information on a background detected through focus search processing performed during imaging are recorded. The digital still camera 1 executes the focus search processing while sequentially approaching an in-focus position from an infinitely far position to a close position. During the focus search, the positional information on an area that comes into focus on the farthest side is determined as the in-focus position information on the background.

In a field F8, pieces of positional information on a face detected during imaging are recorded. During imaging, the control unit 2 uses a template for faces to detect an area in which a face is imaged. The area in which the face is detected is determined as the information on the position of the face. Incidentally, for example, when a user selects an imaging mode for imaging a person, the digital still camera 1 performs focusing so that the area in which the face is detected will come into focus, and acquires raw data DR. If the face is not detected, the fact is recorded as positional information on a face.

In a field F9, pieces of information on a backlight position are recorded. The information on a backlight position is positional information indicating a portion of backlight in a result of imaging. In-focus positions of portions of a result of imaging are detected during focus search. An area in which one entity is recognized as having been imaged and in which when the in-focus position lies on a closer side, the luminance level is lower is detected in the result of the detection of the in-focus positions. Positional information on the detected area is determined as the information on a backlight position.

In a field F10, pieces of information on a saturated position are recorded. The information on a saturated position represents the position of an area in which the luminance level is saturated in terms of the dynamic range offered by the digital still camera 1. The digital still camera 1 varies the f-number during imaging, recognizes variations in the luminance levels of portions derived from the variation in the f-number, and detects an area in which the luminance level is saturated. Positional information on the detected area is determined as the information on a saturated position.

In a field F11, pieces of information on an optical-axis center attained during imaging are recorded. The information on an optical-axis center is determined based on information which specifies the type of lens. If positional information corresponding to the backlight-position information, saturated-position information, or optical-axis center position information is not detected, the fact is recorded.

In a field F12, thumbnail image IFDs are recorded. The data items in the fields F1 to F12 constitute pieces of imaging information DS. The pieces of imaging information DS are fed from the control unit 2 to the raw data file production circuit 10. Next to the field F12, thumbnail image data items DT produced from the raw data items by the control unit 2 are disposed. The thumbnail image data DT is data representing, for example, (640×480) pixels in a color array corresponding to the color array in the image sensor 3. Raw data items DR are disposed next to the thumbnail image data items DT.

The raw data items DR occupy about 95% of an amount of all data items. Since the raw data items are allocated to the trailing field in the file, once about 5% of the file from the leading field thereof is reproduced, the thumbnail image data items and pieces of imaging information DS can be acquired.

FIG. 3 shows the configuration of a computer serving as an information processing system that processes the results of imaging recorded in the recording medium 9. In a computer 21, an interface (IF) 22 reproduces data, which is recorded in the recording medium 9, under the control of a central processing unit 23, and outputs the data onto a bus BUS. The interface 22 records data, which is outputted onto the bus BUS, in the recording medium 9.

A display unit 24 displays various kinds of images under the control of the central processing unit 23. The interface (IF) 25 outputs various kinds of data items, which are required for printing, to a printer 26 under the control of the central processing unit 23. An input unit 27 is formed with a keyboard and a mouse, and notifies the central processing unit 23 of a user's manipulation. A hard disk drive (HDD) 28 records and preserves programs, which describe various kinds of pieces of processing and are executed by the central processing unit 23, and data items.

The program recorded in the hard disk drive 28 may be provided by being recorded in a recording medium such as an optical disk, a magnetic disk, or a memory card. Instead of being provided in the form of the recording medium, the program may be provided by being installed in advance or downloaded over a network such as the Internet.

The central processing unit (CPU) 23 is an arithmetic processing unit of the computer 21, preserves a work area in a random-access memory (RAM) 30 according to a record in a read-only memory (ROM) 29, and invokes an operation system recorded in the hard disk drive 28. In response to a user's manipulation performed on the operation system, the central processing unit downloads the results of imaging, which are recorded in the recording medium 9, into a user-designated folder.

Based on a user's designation detected via the input unit 27, a program (hereinafter, called an editing program) that edits the results of imaging recorded in the hard disk drive 28 is invoked. In a description to be made below, a series of pieces of processing to be executed by the central processing unit 23 in the information processing system will be described on the assumption that the aforesaid raw data file alone is recorded in the recording medium 9.

When the editing program is invoked, the central processing unit 23 displays a main screen M1 of the editing program shown in FIG. 4 on the display unit 24. By selecting a menu displayed in the main screen M1, submenus are displayed in the form of a pull-down menu. A user's choice of a submenu is accepted.

When the user designates the display of a list of the results of imaging, which are recorded in the folder or recording medium 9, by selecting the submenu, the central, processing unit 23 acquires information on the file, which is recorded in the folder or recording medium 9 designated by the user, from a file management system for the folders or the recording medium 9, and selects a file capable of being processed by the editing program. By default, thumbnail images contained in the selected file are displayed in the form of a list within a sub-window M2.

When the user designates the display of a list, the central processing unit 23 acquires the data items of the file concerned by accessing the recording medium 9 or folder. During the processing, the central processing unit 23 monitors the sequentially acquired file data items. When having acquired thumbnail image data items DT produced by thinning raw data items and pieces of information concerning image processing of raw data items, the central processing unit 23 suspends acquisition of the remaining data items from the file. More particularly, when having acquired data items from the fields ranging from the leading field F1 in the raw data file to the field containing the thumbnail image data items DT, the central processing unit 23 suspends acquisition of data items from the remaining fields.

Thereafter, the central processing unit 23 analyzes IFDs of the acquired data items, and develops the acquired data items. Through the processing of developing data items, the central processing unit 23 acquires the thumbnail image data items DT from among the acquired data items, and acquires pieces of information necessary for reproducing the thumbnail image data items DT. In addition, pieces of imaging information on pickup and pieces of imaging information on editing processing are acquired based on the settings designated in advance by the user.

Thereafter, the central processing unit 23 performs image-quality correction on the acquired thumbnail image data items DT using pieces of image-quality correction information determined as the pieces of imaging information on pickup, and produces thumbnail image data items representing the same image qualities as the image qualities displayed during imaging. More particularly, based on the pieces of image-quality correction information determined as the pieces of imaging information, the central processing unit 23 regenerates the settings designated for the image processing circuit 6 at the time of picking up main image data items, performs gamma correction and white balance adjustment on the thumbnail image data items DT according to the regenerated settings, and adjusts a gray scale, a hue, and a frequency characteristic represented by each of the thumbnail image data items. The central processing unit 23 records images of the thumbnail image data items having undergone image-quality correction, in a display image memory.

Thereafter, after completing acquisition of thumbnail images by the number of images to be displayed within the sub-window M2, the central processing unit 23 displays the sub-window M2 with the image data recorded in the image memory. The central processing unit 23 displays the list of thumbnail images so as to display the results of imaging recorded in the recording medium 9 or the results of imaging downloaded into the computer 21.

If the user selects a thumbnail image from the displayed list of thumbnail images within the sub-window M2, the central processing unit 23 displays a sub-window M3 in the main screen M1, and displays the associated result of imaging in enlargement within the sub-window M3. If the user varies the size of the sub-window M3 within the sub-window M3, the size of the sub-window M3 is varied responsively to the user's manipulation, and the associated result of imaging is displayed. If full-screen display is designated within the sub-window M3, the associated result of imaging is displayed in the main screen M1 in a full-screen display manner. The central processing unit 23 executes the full-screen display of the result of imaging by displaying the thumbnail image in enlargement, whereby user-friendliness improves.

If the user selects a thumbnail image from the display of the list of thumbnail images and designates display of imaging information, the imaging information used to perform image-quality correction on the selected thumbnail image is displayed. For example, a gamma characteristic is displayed in the form of a characteristic curve, and items contained in the imaging information are displayed. As the items, an adjustment mode for white balance adjustment, a magnitude of fine adjustment for white balance adjustment, a magnitude of adjustment of a color rendering property, a magnitude of adjustment of saturation, and a magnitude of adjustment of a contrast are adopted.

If the user selects a thumbnail image from the display of the list of thumbnail images, and designates editing, or if the user designates editing of the result of imaging displayed in the main screen M1 or within the sub-window M3, the central processing unit 23 displays a sub-window M4 for editing manipulations.

The sub-window M4 for editing manipulations is a window within which an image-quality correction item is selected and a magnitude of image-quality correction is designated. The sub-window M4 for editing manipulations is created so that the image-quality correction items can be selected by switching displays using tabs. The sub-window M4 is created so that a magnitude of adjustment can be designated for each adjustment item by performing the number of manipulations identical to the number of manipulations performed via a user interface in order to designate the settings of the digital still camera 1. More particularly, within the sub-window M4, adjustment buttons for, for example, a color temperature, a color rendering property, exposure correction, sharpness, and noise reduction are displayed together with magnitudes of adjustments with the settings for imaging as references.

The central processing unit 23 displays as a preview a full screen containing the result of imaging, which the user has selected, within a sub-window M5. In response to the user's designation, the central processing unit 23 displays within a sub-window M6 the result of any of various kinds of analyses performed on the result of imaging displayed in the preview screen. The display of the result of analysis in the example of FIG. 4 is the display of a histogram expressing a distribution of gray levels represented by color signals.

The central processing unit 23 executes display of the preview screen and display of the result of analysis using thumbnail image data. The central processing unit 23 switches the display of the sub-window M4 from one to another responsively to selection of any of the tabs within the sub-window M4, and accepts the settings of the adjustment items. At this time, the central processing unit 23 varies the image quality of the preview screen so that the variation in the image quality will correspond to variations in the magnitudes of adjustments made by the user.

In other words, when the user varies the magnitudes of adjustments within the sub-window M4, the central processing unit 23 corrects imaging information, based on which the thumbnail image being displayed in the preview screen is subjected to image-quality correction, according to the variations in the magnitudes of adjustments. The corrected imaging information is used to perform image-quality correction on the thumbnail image data, and displays an image, which results from the processing, as a preview. Information necessary to display a result of analysis is acquired through processing of the image data having undergone image-quality correction. The acquired information is used to switch the display within the sub-window M6 from one to another.

The central processing unit 23 executes preview processing responsively to a user's manipulation. If the user checks a check box for image-quality adjustment displayed within the sub-window M4, the central processing unit 23 changes the image quality of the preview screen within the sub-window M5 so that the change will follow the change in the image quality of the preview screen made within the sub-window M4. Concurrently, the central processing unit 23 changes the image quality of the display of the result of imaging within the sub-window M3, or changes the image quality of the full-screen display of the result of imaging in the main screen M1. At this time, if the user designates enlarged display of a specific area in the preview screen, a frame W is displayed in the preview screen in order to indicate the specific area. The specific area is displayed in enlargement in the display of the result of imaging within the sub-window M3 or in the full-screen display of the result of imaging within the main screen M1.

Even in this case, the central processing unit 23 first displays the result of imaging, which results from editing processing performed on a thumbnail image, within the sub-window M3 or main screen M1. Thus, the result of imaging subjected to the editing processing is displayed shortly responsively to a manipulation performed by a user. User-friendliness improves. In addition, after the result of imaging having undergone the editing processing is displayed by displaying in enlargement the thumbnail image, raw data is subjected to editing processing and display is replaced with another. Thus, the image quality of the displayed result of imaging is improved without the necessity of intervening in various kinds of pieces of processing designated by the user.

Actions to be performed in the embodiment of the present invention will be outlined below. In the digital still camera 1 (FIG. 1), an optical image is formed on the imaging surface of the image sensor 3 by an optical system, which is not shown, according to a shutter speed and an f-number that are designated by a user. A result of imaging performed to pick up the optical image is outputted from the image sensor 3 responsively to a manipulation which the user has performed with an operating piece, and processed by the pre-processing circuit 4 and defect correction circuit 5. Raw data DR that is image data which represents the result of imaging but has not undergone image-quality correction is produced. The raw data DR is subjected to image-quality correction by the image processing circuit 6, and displayed on the display unit.

In the digital still camera 1, by checking a result of imaging displayed on the display unit, results of imaging which a user recognizes as unnecessary ones are not preserved but discarded. In contrast, results of imaging which the user recognizes as necessary ones are recorded in the recording medium 9 in a user-designated preservation form. Specifically, if the user designates recording in an Exif file, image data items having undergone image-quality correction are compressed by the encoder 7, and placed in the Exif file together with thumbnail image data items, which have undergone image-quality correction, and pieces of imaging information. The Exif file is recorded in the recording medium 9. In contrast, if the user designates recording of the results of imaging in the form of the raw data items DR, a raw data file is created with the raw data items DR, thumbnail image data items DT each of which is produced by thinning the raw data DR, and pieces of imaging information DS on pickup each of which includes image-quality correction information specifying image-quality correction processing to be performed by the image processing circuit 6. The raw data file is recorded in the recording medium 9.

In the raw data file, the results of imaging (raw data items DR) are recorded. If the raw data items DR are presented to the user in the form of thumbnail images, the thumbnail image data items DT are subjected to image-quality correction according to pieces of image-quality correction information. The results of imaging exhibiting the image quality which the user has checked during imaging can be displayed using the thumbnail images. The processing of displaying the thumbnail image data items after performing image-quality correction on the thumbnail image data items according to the pieces of image-quality correction information does not involve production of thumbnail image data items from the raw data items DR. Therefore, the results of imaging can be displayed shortly and checked. User-friendliness is therefore more greatly improved than it conventionally is.

Since an amount of raw data items is large, it takes much time to load raw data items from the recording medium. However, since an amount of data items that is much smaller than the amount of raw data items and occupies an area extending from the leading position in the file to a recording beginning position of the raw data items should merely be loaded and processed, the results of imaging can be displayed shortly. User-friendliness can be improved.

In the digital still camera 1, the leading side of the raw data file (FIG. 2) is, similarly to the Exif file, occupied with pieces of information on main image data items and thumbnail image data items that are compressed under the JPEG and subjected to image-quality correction. The raw data items DR are allocated to the tailing side of the raw data file. Therefore, in the digital still camera 1, various application programs that have difficulty in processing data items recorded in intermediate fields in the raw data file can process the raw data items DR, and can display thumbnail image data items that are compressed under the JPEG and subjected to image-quality correction. The general versatility of the raw data file can be upgraded. Incidentally, in the Exif file, since thumbnail image data items that have not been compressed can be substituted for thumbnail image data items that have been compressed and subjected to image-quality correction, the thumbnail image data items that have not been compressed may be substituted for the thumbnail image data items that have been compressed and subjected to image-quality correction.

For recording of the results of imaging in the digital still camera, aside from the method using raw data items, a method of compressing and recording image data items having undergone image processing may be employed as it is for the Exif file. However, in the Exif file, thumbnail image data items having undergone image processing are recorded in association with image data items having been compressed and having undergone image processing. Therefore, it is hard to display thumbnail images so that a change in image quality derived from editing processing will be reflected on each of the images. In contrast, in the raw data file employed in the embodiment, the change in image quality derived from editing processing can be reflected on display of each of thumbnail images by utilizing imaging information on editing processing. User-friendliness can therefore be improved.

Imaging information on pickup includes, in addition to image-quality correction information specifying image-quality correction processing to be performed by the image processing circuit 6, information on the settings of the optical system including a shutter speed and an f-number. Therefore, editing processing can be performed in various manners by changing various kinds of settings which are associated with manipulations performed on the digital still camera 1 during imaging.

However, in various kinds of pieces of editing processing for processing raw data items, a magnitude of adjustment for noise reduction may be varied or sharpness may be adjusted. In addition, a focus may be checked. In this case, the results of processing cannot be checked with thumbnail images. The details of the results of imaging have to be discussed minutely. Therefore, in the raw data file, in-focus position information, background position information, and face position information are included as reference information for use in designating an area in which the details are checked. The pieces of information are recorded as information on imaging (FIG. 2).

Therefore, according to the raw data file in the embodiment, when a user-desired region in an image represented by raw data is partly enlarged and then displayed, the region to be enlarged and displayed can be readily and accurately designated based on the reference information for area designation during editing. The time required for checking the details of a result of imaging can be shortened compared with the time required conventionally.

As for the results of imaging recorded as mentioned above in the recording medium 9, after the recording medium 9 is mounted in the computer 21 (FIG. 3), thumbnail image data items and pieces of imaging information on pickup are sequentially reproduced responsively to a user's manipulation. The thumbnail image data items are subjected to image-quality correction processing according to the pieces of imaging information on pickup, and displayed in the form of a list (FIG. 4). Therefore, the results of imaging represented by the raw data file are displayed in the form of the list of thumbnail images. Thus, the thumbnail images are provided shortly, and use-friendliness can be improved.

When the results of imaging are displayed in the form of a list using thumbnail images, thumbnail image data items are, if necessary, subjected to image-quality correction according to pieces of imaging information on editing processing in place of pieces of imaging information on pickup, and then displayed. A change in image quality derived from the editing processing can be reflected on each of the results of imaging represented by raw data items, and the results of imaging are then displayed in the form of a list using thumbnail images.

In the display of a list, if the display of a result of analysis of image data such as any of a luminance distribution in a result of imaging or a histogram of colors therein is designated, the result of analysis to be displayed is detected by processing thumbnail image data. A characteristic curve based on the result of analysis is displayed together with a thumbnail image. In the present embodiment, even the display is executed by analyzing thumbnail image data, the result of analysis can be shortly acquired and displayed. User-friendliness can be improved compared with it is conventionally. Thus, an information processing system can provide at a high speed thumbnail images, on each of which an effect of adjustment equivalent to the effect exerted on an image during adjustment is reflected, in response to a user's request.

FIG. 5A shows only a configuration relating to resolution conversion and included in the image processing circuit 6 in the embodiment of the present invention. A signal SG41 that has not undergone resolution conversion is fed from the defect correction circuit 5 to the phase retention resolution conversion section 42 through an input terminal 41. The signal SG41 is a signal in which color signals exist in a color array corresponding to the color array in the image sensor 3.

To the phase retention resolution conversion section 42, a control signal specifying a conversion rate for resolution conversion is fed through a terminal 43. The specified conversion rate is associated with a resolution needed in the information processing system. When a maximum resolution is specified, the phase retention resolution conversion section 42 does not perform thinning. In a circumstance in which the number of pixels in the image sensor 3 rapidly increases, the maximum resolution is not always requested. A user can therefore designate a desired resolution. Raw data DR is fed to the control unit 2, and also fed to the de-mosaicing processing section 44. The de-mosaicing processing section 44 converts a signal SG42, which represents the order of the color array in the image sensor 3, into RGB signals.

As shown in FIG. 5B, the raw data SG41 that has not undergone resolution conversion is a signal representing, for example, (3888×2608) pixels in the color array identical to the color array in the image sensor 3. The output signal SG42 of the phase retention resolution conversion section 42 is a signal representing, for example, (1280×960) pixels in the color array identical to the color array in the image sensor 3. The output signals SG44 of the de-mosaicing processing section 44 are RGB signals representing, for example, (1280× 960) pixels. Namely, each of the color signals for primary colors represents (1280×960) pixels. Image-quality correction processing including gamma correction and white balance correction is performed in the de-mosaicing processing section 44, though they are not shown in FIG. 5A.

The output signals SG44 of the de-mosaicing processing section 44 are fed to the thin-line retention resolution conversion section 45. A control signal specifying a conversion rate for resolution conversion is fed to the thin-line retention resolution conversion section 45 through a terminal 46. With both the specification of the conversion rate for the phase retention resolution conversion section 42 and the specification of the conversion rate for the thin-line retention resolution conversion section 45, a desired resolution is obtained finally. Output signals SG45 of the thin-line retention resolution conversion section 45 are applied to an output terminal 47. The encoder 7 (see FIG. 1) is connected to the output terminal 47.

As shown in FIG. 5B, the output signals SG45 of the thin-line retention resolution conversion section 45 are RGB signals representing, for example, (640×480) pixels. A linear matrix arithmetic unit is included to handle an output of the thin-line retention resolution conversion section 45. YC signals (for example, (4:2:2) component signals) SG48 representing, for example, (640×480) pixels are outputted from the encoder 7. The YC signals are recorded as a normal pickup image in the recording medium 9. In the present invention, the resolution conversion sections are separately disposed in stages preceding and succeeding the de-mosaicing processing section 44.

As shown in FIG. 5C, aside from the YC signals (component signals) SG48 representing (640×480) pixels, the signal SG42 representing a color array, a signal SG51 representing (640×480) pixels in a color array and acting as thumbnail image data DT, and imaging information (not shown) are recorded in the recording medium 9.

In the computer acting as an information processing system, the aforesaid image-data processing is carried out, and RGB signals SG53 representing, for example, (320×240) pixels are produced from the signal SG51. The RGB signals SG53 are image signals representing an adjusted partly enlarged image (displayed within the sub-windows M2, M3, and M5). When all adjusted images are displayed in a display device included in the information processing system, RGB signals representing (640×480) pixels and being produced from the signal SG42 are employed.

Resolution conversion processing in the aforesaid embodiment of the present invention will be detailed below. FIG. 6 is a diagram for use in explaining processing to be performed by the phase retention resolution conversion section 42. The signal SG41 that has not undergone resolution conversion is a signal representing a color array corresponding to the color array in the image sensor 3 which is the Bayer array having, for example, green pixels arranged checkerwise (in the form of a five-square lattice pattern). For brevity's sake, an image having (18×18) pixels and having each pixel represented by binary data (pixels expressed with hatched squares are driven to a high level, and pixels expressed with squares that are not hatched are driven to a low level) will be taken as an example. Herein, a binary image is taken for instance in order to express the concept. Every digital signal processing is a superposition of binary operations, and apparently lies in an extension of the concept.

The phase retention resolution conversion section 42 multiplies five pixel values, which exist in a horizontal direction and a vertical direction, by coefficients (1, 0, 2, 0, 1), calculates a ¼ of the result of the multiplication, rounds the quarter, and performs ⅓ thinning processing. As a result, the signal SG42 representing (1280×960) pixels in a color array is obtained from the signal SG41 representing (3888×2608) pixels. In short, during phase retention resolution conversion, resolution conversion is performed with the color array retained.

The de-mosaicing processing section 44 performs, as shown in FIG. 7, de-mosaicing processing on the output signal SG42 of the phase retention resolution conversion section 42. The de-mosaicing processing determines output pixels by majority vote using an own pixel and eight ambient pixels. Signals SG44 having undergone de-mosaicing processing are RGB signals.

FIG. 8 shows an example of majority-decision processing to be performed in a case where pixel values are binary (a high level and a low level). At step S1, designation of a pixel concerned (a pixel to be processed), designation of an output color, and designation of initial values of variables (h=0, l=0) are carried out.

At step S2, the signal level of the pixel concerned is decided. If the signal level is the low level, the variable l is set to (l=l+1) at step S3. If the signal level is the high level, the variable h is set to (h=h+1) at step S4.

At step S5, the ambient pixels are designated. When all the ambient pixels have been designated, whether the color of each of the ambient pixels is identical to the output color is decided at step S6. If the color is not identical to the output color, the process returns to step S5. If the color, is identical to the output color, the signal level of each of the ambient pixels is decided at step S7. If the signal level is the low level, the variable l is set to (l=l+1) at step S8. If the signal level is the high level, the variable h is set to (h=h+1) at step S9. The process then returns to step S5 (designation of ambient pixels).

If a decision is made at step S5 that eight ambient pixels have already been designated in an area (3×3) with the pixel concerned as a center, whether the variable is larger than 1 (h>1) is decided at step S10. If not, it means that the number of low-level pixels is larger than the number of high-level pixels among the pixel concerned and the pixels out of the eight ambient pixels having the same color as the output color. At step S11, an output is set to the variable l (low level). If the variable h is larger than 1 (h>1), it means that the number of high-level pixels is larger than the number of low-level pixels among a total of nine pixels including the pixel concerned and eight ambient pixels. At step S12, an output is set to the variable h (low level).

Through the de-mosaicing processing, the signal representing the color array in the image sensor 3 is converted into RGB signals. The RGB signals SG44 sent from the de-mosaicing processing section 44 are fed to the thin-line retention resolution conversion section 45, and subjected to thin-line retention resolution conversion processing like the one shown in FIG. 9.

FIG. 9 shows an example in which ½ resolution conversion is performed and the resolution conversion is achieved through pattern recognition. A table which is shown in FIG. 9 and in which values are specified in advance by performing pattern recognition for fear thin lines may disappear signifies that a value of one output pixel is determined based on a pattern of two input pixels and two ambient pixels. The second and third bits of four-bit data correspond to the input pixels.

When thin-line retention resolution conversion is performed using the table, RGB signals SG45 exhibiting a halved resolution are obtained. Owing to the resolution conversion through pattern recognition, thin lines in an image having undergone the conversion will not disappear. Further, the RGB signals SG45 are converted into YC signals (for brevity's sake, a Y signal alone is shown) SG48.

Referring to FIG. 10 and FIG. 11, the resolution conversion processing of the thin-line retention resolution conversion section 45 will be detailed below by taking an R signal for instance. As shown in FIG. 10, signals SG44b into which the R signal SG44a having undergone de-mosaicing processing is decomposed in units of pixels concerned (2×2) are produced. Ambient pixels are located on the perimeter of the area of the pixels concerned. For example, four pixels (R10, R11, R12, and R13) are arrayed in a horizontal direction, the pixels R10 and R13 are ambient pixels, and the pixels R11 and R12 are the pixels concerned. The four pixels have values (0001). The values of four pixels on one row including the pixels concerned R13 and R14 are (0100). Thus, as the pixels concerned, two pixels are designated while do not overlap.

The values of four pixels lined in the horizontal direction (two pixels concerned and two ambient pixels) are converted into one output pixel according to the table shown in FIG. 9 in order to produce a signal SG44c having ½ resolution conversion performed in the horizontal direction. For example, since (0001) is converted into (0), the pixels R11 and R12 are converted into a pixel R11 having the value (0). Since (0100) is converted into (1), the pixels R13 and R14 are converted into a pixel R13 having the value (1).

After a resolution is converted in the horizontal direction into a ½ resolution, the resolution is, as shown in FIG. 11, converted in the vertical direction into a ½ resolution. In FIG. 11, the signal SG44c having the resolution converted in the horizontal direction into the ½ resolution through the foregoing processing is produced from the signal SG44a. The values of four pixels (two pixels concerned and two ambient pixels) lined in the vertical direction are converted into one output pixel according to the table shown in FIG. 9, whereby a signal SG44d having ½ resolution conversion performed in the vertical direction is produced. The signal SG44d has the resolution converted into a ¼ of the resolution of the input signal SG44a. In the signal SG44d having undergone resolution conversion, a thin line represented by the input signal SG44a is not lost but is preserved.

For example, four pixels (R01, R11, R21 and R31) are lined in the vertical direction, the pixels R01 and R31 are ambient pixels, and the pixels R11 and R21 are pixels concerned. The values of the four pixels are (0000). The values of four pixels on one row including the pixels concerned R13 and R23 are (1111). The four pixels are converted into one output pixel according to the table shown in FIG. 9. For example, since (0000) are converted into (0), the pixels R11 and R21 are converted into a pixel R11 having the value (0). Since (1111) are converted into (1), the pixels R13 and R23 are converted into a pixel R13 having the value (1). Incidentally, thin-line retention resolution conversion is performed on the other color signals (G signal and B signal) in the same manner as it is on the foregoing R signal.

FIG. 12 comprehensively shows the foregoing pieces of resolution conversion processing in the embodiment of the present invention. In FIG. 12, an output signal SG41 of the image sensor 3, and signals SG41' that are color components into which the signal SG41 is decomposed are shown. Phase retention resolution conversion processing is performed in units of a color component, and a signal SG42 having undergone ⅓ thinning is obtained. A region (6×6) in the signal SG41 is reduced to a region (2×2).

De-mosaicing processing is performed on the signal SG42, whereby RGB signals SG44 are obtained. Further, signals SG45 having undergone ½ thinning are obtained by performing thin-line retention resolution conversion processing through pattern recognition. The signals SG45 have a resolution decreased to a ⅙ of the resolution of the signal SG41 that has not undergone the processing. In the signals SG45, a pattern of originally existent thin lines is not lost but is preserved even after the resolution conversion. Namely, degradation in image quality derived from the resolution conversion can be suppressed.

In the embodiment of the present invention, the phase retention resolution conversion section 42 is disposed in a stage preceding the de-mosaicing processing section 44, and performs ⅓ thinning in the horizontal and vertical directions. Therefore, a de-mosaicing processing time can be reduced to a ⅑. In this case, an effect of a reduction in an amount of information is expected to be nearly nine times larger.

In the above description, simple filtering processing is taken as an example of phase retention resolution conversion. Alternatively, a bilinear method, a bi-cubic method, a Lanczos method, or any other existing phase retention resolution conversion technique may be adopted. In addition, although simple majority decision processing is taken as an example of de-mosaicing, a total variation method or any other existing de-mosaicing technique may be adopted.

Further, although simple pattern recognition is taken as an example of thin-line retention resolution conversion, an existing downconversion technique intended to preserve edges such as a technique described in Japanese Patent No. 3654420 or a downconversion technique intended to prevent a moiré such as a technique described in Japanese Patent No. 3483426 may be adopted.

In the above description of thin-line retention resolution conversion, each pixel is described to be one bit long for brevity's sake. Even when each pixel is 16 bits long, the aforesaid thin-line retention resolution conversion can be applied in the same manner. Another example of thin-line retention resolution conversion to be applied to the pixel of 16 bits long will be described below with reference to FIG. 13 and FIG. 14.

In another example, an original image 71 is fed to a bi-cubic resolution conversion section 72, a pattern recognition section 73, and a weighting-coefficient arithmetic section 74. Both a bi-cubic-resolution conversion completed image (16 bits) 75 sent from the bi-cubic resolution conversion section 72 and a weighting coefficient sent from the weighting-coefficient arithmetic section 74 are fed to a weighting arithmetic section 76. The certainty of pattern recognition is assessed based on the signal level of a pixel concerned, and weighting is carried out. The resultant image is synthesized with the bi-cubic-resolution conversion completed image.

In the pattern recognition section 73, a relatively wide range of ambient pixels are compared with the pixel concerned by a $\epsilon$ filter 77 (step 78). If the pixel concerned is relatively higher, "1" signifying binary thin-line retention resolution conversion is adopted. If the pixel concerned is lower, "0" is adopted. An original image (1 bit) 79 ensues.

After binary coding is completed, a pattern recognition section 80 performs pattern recognition according to a process similar to the one described with reference to FIG. 10 and FIG. 11. The pattern recognition provides a pattern-recognition conversion completed image (1 bit) 81.

The certainty of the pattern recognition is assessed by the weighting coefficient arithmetic section 74. The processing of the weighting coefficient arithmetic section 74 is shown in FIG. 14A and FIG. 14B. The certainty of each of all pixels in a binary-coded image, which is regarded as a binary-coded pattern, (the axis of abscissas) is assessed based on the signal level (the axis of ordinates) of an associated pixel in the original image. The certainties of all pixels employed in pattern recognition are assessed, and the total product is regarded as the certainty of all patterns. In the weighting arithmetic section 76, the certainty is used as a coefficient, and a binary image 81 having undergone the pattern recognition is multiplied by the coefficient. The result of the multiplication and the result of processing performed by the bi-cubic resolution conversion section 72 are added up and normalized, whereby an image (16 bits) having undergone thin-line retention resolution conversion is obtained.

The present applicant has proposed in the previous application (Patent Application No. 2006-166858) a technique of providing thumbnail images, on each of which an effect of adjustment equivalent to an effect exerted in an original image during adjustment is reflected, at a high speed in response to a user's request. In the application, not only the configuration of a processing unit in the present invention but also a processing unit having a configuration (reference example) shown in FIG. 15A is permitted to be adopted.

Resolution conversion processing in the embodiment of the present invention can prevent degradation in image quality compared with that performed in the configuration shown in FIG. 15A as the reference example. The configuration shown in FIG. 15A feeds a signal S61, which is fed from an image sensor to an input terminal 61, to a raw data generation circuit, also feeds the signal to a de-mosaicing processing section 62, and produces RGB signals SG62. The RGB signals SG62 are fed to a phase retention resolution conversion section 63, and thinned to approximately ⅙ signals. Output signals SG63 are produced. A control signal specifying a resolution is fed to the phase retention resolution conversion section 63 through a terminal 64.

As shown in FIG. 15B, the signal SG61 that has not undergone resolution conversion is a signal representing, for example, (3888×2608) pixels in a color array corresponding to the color array in the image sensor 3. The output signals SG62 of the de-mosaicing processing section 62 are RGB signals representing, for example, (3888×2608) pixels.

As shown in FIG. 15B, the output signals SG63 of the phase retention resolution conversion section 63 are RGB signals representing, for example, (640×480) pixels. YC signals (component signals) SG66 representing, for example, (640×480) pixels are outputted from an encoder. The YC signals are pickup image signals.

As shown in FIG. 15C, aside from the YC signals (component signals) SG66 representing (640×480) pixels, the signal (raw data) SG61 representing the color array, a signal SG67 representing (777×512) pixels in the color array and serving as thumbnail image data, and imaging information (not shown) are recorded in a recording medium.

In an information processing system, RGB signals SG68 representing, for example, (388×260) pixels are produced from the signal SG67. The RGB signals SG68 are image signals representing an adjusted and partially enlarged image. For displaying an adjusted full image on a display device included in the information processing system, the RGB signals SG62 representing (3888×2608) pixels and being produced from the signal SG61 are employed.

FIG. 16 comprehensively shows the processing of resolution conversion performed by the configuration shown in FIG. 15A. FIG. 16 shows signals SG61' that are color components into which the output signal SG61 of the image sensor 3 is decomposed. De-mosaicing processing is performed on the signal SG61 in units of a color, whereby the RGB signals SG62 are obtained. Further, the signals SG63 produced by thinning the RGB signals into ⅙ signals are provided by the phase retention resolution conversion section 63. The signals SG63 have a resolution obtained by decreasing the resolution of the signal SG61, which has not undergone the processing, into a ⅙.

The phase retention resolution conversion section 63 multiplies the values of pixels of a predetermined color, which exist in the horizontal direction (vertical direction), by coefficients (1, 1, 2, 2, 1, 1), calculates a ⅛ of each of the results of the multiplication, rounds the results of the calculations, and thus performs ⅙ thinning processing. Owing to the ⅙ thinning, the signals SG63 represent an image in which thin lines existent in an image represented by the signals SG62 disappear and which has a resolution greatly degraded. The output signals SG45 obtained in the embodiment of the present invention are shown for comparison in FIG. 16. In the signals SG45, the pattern of thin lines is not lost but is preserved despite the resolution conversion.

In the configuration shown in FIG. 15A, de-mosaicing processing and phase retention resolution conversion processing are performed on a signal representing the same number of pixels as the number of pixels in the image sensor. Compared with the processing in the embodiment of the present invention, a long processing time is required and continuous-shooting speed performance is degraded. In addition, an amount of information carried by a signal and recorded in a recording medium is so large that it takes much time to achieve processing of recording or reproducing or processing to be performed by an information processing system. The present invention is advantageous in that it is not confronted with these problems.

In the configuration shown in FIG. 15A, a thin-line retention resolution conversion section may be substituted for the phase retention resolution conversion section 63. However, if thin-line retention resolution conversion is performed on an image having quite a number of pixels, an amount of processing such as pattern recognition becomes enormous. A long processing time is required. In addition, since unnecessarily large thin lines remain, continuous shooting performance or image quality is degraded. Therefore, the advantage provided by the inclusion of the thin-line retention resolution conversion section is limited.

The aforesaid signal processing in accordance with the present invention is performed in both or one of a signal processing unit 52 included in an imaging apparatus, to which a pickup signal of an image sensor 51 is fed, and an information processing system (computer) 53 as shown in FIG. 17. The pickup signal is inputted to the phase retention resolution conversion section 42 included in the signal processing unit 52. The output signal of the phase retention resolution conversion unit 42 is inputted to de-mosaicing processing sections 44A and 44B.

In the imaging apparatus, data having undergone thinning and having been processed by the de-mosaicing processing section 44A and a thin-line retention resolution conversion section 45A is fed to an encoder 54, subjected to compression and encoding, for example, JPEG-conformable processing, and then outputted. In a signal processing unit 53 in the information processing system, data thinned by the phase retention resolution conversion section 42 is processed by the de-mosaicing processing section 44B and a thin-line retention resolution conversion section 45B.

The embodiment of the present invention has been concretely described so far. The present invention is not limited to the aforesaid embodiment, but can be modified in various manners on the basis of the technological idea of the invention. For example, in the aforesaid embodiment, a description has been made of a case where the results of imaging acquired by a digital still camera are outputted to a recording medium and processed by a computer. The present invention is not limited to this case, but can be applied to a case where data is outputted to the computer by utilizing data communication such as radio communication, and then processed. The color array in an image sensor has been described to have green pixels arranged checkerwise. An image sensor adopting any other color array may be employed.

In the aforesaid embodiment, a description has been made of a case where a digital still camera is used to acquire the results of imaging. The present invention is not limited to this case, but may be applied to a case where a video camera or a portable cellular phone with a camera is used to acquire the results of imaging that are still images. Further, in the aforesaid embodiment, a description has been made of a case where a computer is used to process the results of imaging. The present invention is not limited to this case, but may be applied to a case where a dedicated processing system is used to process the results of imaging.

The invention claimed is:

1. A signal processing method comprising the steps of:
    performing first resolution conversion for phase retention on a signal that is fed from an image sensor, that has undergone defect correction processing, and that represents the order of the color array in the image sensor;
    performing color separation processing on a first signal resulting from the first resolution conversion; and
    performing second resolution conversion for thin-line retention on second signals resulting from the color separation processing,
    wherein performing second resolution conversion comprises performing bi-cubic conversion on an original image to generate a bi-cubic conversion completed image, performing pattern recognition on the original image to generate a pattern recognition conversion completed image, generating a certainty based on the original image, multiplying the pattern recognition conversion completed image by the certainty to generate a multiplication result, adding the multiplication result to the bi-cubic conversion completed image to generate an addition result, and normalizing the addition result,
    wherein the steps of performing said first and second resolution conversions are done by an image processing circuit.

2. The signal processing method according to claim 1, further comprising a step of compressing third signals, which are obtained at the step of performing the second resolution conversion, by performing compression and encoding.

3. The signal processing method according to claim 2, wherein the signals resulting from the compression and encoding are component signals including a luminance signal and a chrominance signal.

4. The signal processing method according to claim 1, wherein conversion rates for the first resolution conversion and second resolution conversion are specified with control signals.

5. The signal processing method according to claim 1, wherein the second signals are RGB signals.

6. A signal processing system comprising:
    a phase retention resolution conversion section that performs first resolution conversion for phase retention on a signal which is fed from an image sensor, which has undergone defect correction processing, and which represents the order of the color array in the image sensor;
    a color separation processing section that performs color separation processing on the first signal resulting from the first resolution conversion; and
    a thin-line retention resolution conversion section that performs second resolution conversion for thin-line retention on second signals resulting from the color separation processing,
    wherein performing second resolution conversion comprises performing bi-cubic conversion on an original image to generate a bi-cubic conversion completed image, performing pattern recognition on the original image to generate a pattern recognition conversion completed image, generating a certainty based on the original image, multiplying the pattern recognition conversion completed image by the certainty to generate a multiplication result, adding the multiplication result to the bi-cubic conversion completed image to generate an addition result, and normalizing the addition result.

7. The signal processing method according to claim 6, further comprising a recording unit that records in a recording medium, which are produced by compressing third signals resulting from the second resolution conversion, and imaging information in the form of a file.

8. The signal processing system according to claim 6, wherein;
    the phase retention resolution conversion section is included in an imaging apparatus;
    the color separation processing section and thin-line retention resolution conversion section are included in an information processing system; and
    the imaging apparatus outputs the first signal to the information processing system.

* * * * *